(12) United States Patent
Stumpf

(10) Patent No.: US 12,384,266 B2
(45) Date of Patent: Aug. 12, 2025

(54) MOBILE PLATFORM FOR CHARGING ELECTRIC VEHICLES

(71) Applicant: Fuelie Systems, Inc., Lewes, DE (US)

(72) Inventor: Thomas R. Stumpf, Chapel Hill, NC (US)

(73) Assignee: FUELIE SYSTEMS, INC., Lewes, DE (US)

( * ) Notice: Subject to any disclaimer, the term of this patent is extended or adjusted under 35 U.S.C. 154(b) by 0 days.

(21) Appl. No.: 18/281,391

(22) PCT Filed: Mar. 11, 2022

(86) PCT No.: PCT/US2022/019933
§ 371 (c)(1),
(2) Date: Sep. 11, 2023

(87) PCT Pub. No.: WO2022/192660
PCT Pub. Date: Sep. 15, 2022

(65) Prior Publication Data
US 2024/0300351 A1    Sep. 12, 2024

Related U.S. Application Data

(60) Provisional application No. 63/194,317, filed on May 28, 2021, provisional application No. 63/160,389, filed on Mar. 12, 2021.

(51) Int. Cl.
*H02J 7/00*     (2006.01)
*B60L 53/30*    (2019.01)
*B60L 53/50*    (2019.01)
*B60L 53/51*    (2019.01)
*B60L 53/53*    (2019.01)

(52) U.S. Cl.
CPC .............. *B60L 53/30* (2019.02); *B60L 53/50* (2019.02); *B60L 53/51* (2019.02); *B60L 53/53* (2019.02); *B60L 2200/28* (2013.01)

(58) Field of Classification Search
USPC ........................................................ 320/109
See application file for complete search history.

(56) References Cited

U.S. PATENT DOCUMENTS

| 4,961,403 | A | 10/1990 | Kawaguchi et al. |
| 6,382,225 | B1* | 5/2002 | Tipton ................... B60K 15/00 123/514 |
| 7,469,541 | B1* | 12/2008 | Melton ................... H02S 20/32 60/641.1 |

(Continued)

*Primary Examiner* — Samuel Berhanu
(74) *Attorney, Agent, or Firm* — COATS & BENNETT, PLLC

(57) ABSTRACT

A mobile platform that is equipped to charge an electrical vehicle and supply liquid fuel to an internal combustion engine vehicle. The mobile platform includes a chassis configured to be pulled by a tow vehicle. A battery bank is positioned on the chassis. A renewable energy recharging device and a liquid fuel powered recharging device are each positioned on the chassis to recharge the battery bank. An electrical terminal is operatively connected to the battery bank to deliver electric power from the battery bank to an electric vehicle. A fuel tank is positioned on the chassis to store liquid fuel and a fuel line extends from the fuel tank to deliver the liquid fuel to an internal combustion engine vehicle.

19 Claims, 25 Drawing Sheets

(56) References Cited

U.S. PATENT DOCUMENTS

| | | | |
|---|---|---|---|
| 8,176,931 B1* | 5/2012 | Cajiga | B60S 5/02 |
| | | | 137/234.6 |
| 2009/0079161 A1 | 3/2009 | Muchow et al. | |
| 2010/0072757 A1* | 3/2010 | Kealy | F02B 37/001 |
| | | | 290/1 A |
| 2010/0320959 A1* | 12/2010 | Tomberlin | B62D 31/003 |
| | | | 320/109 |
| 2017/0012464 A1 | 1/2017 | Sant'Anselmo et al. | |
| 2020/0324683 A1 | 10/2020 | Stumpf et al. | |

* cited by examiner

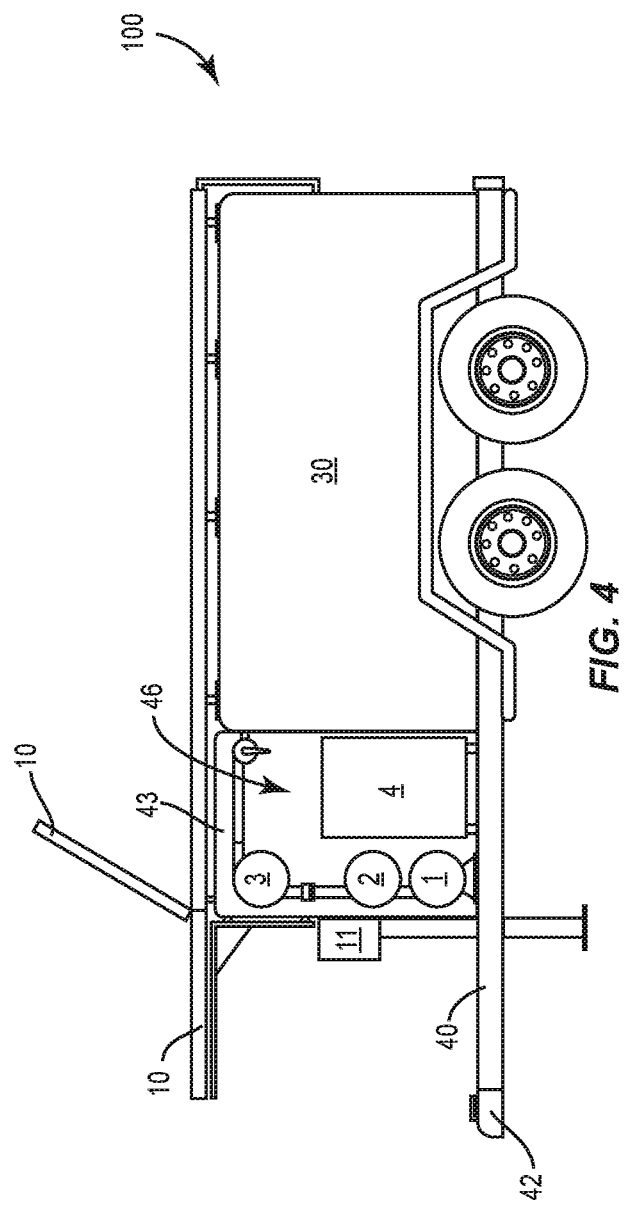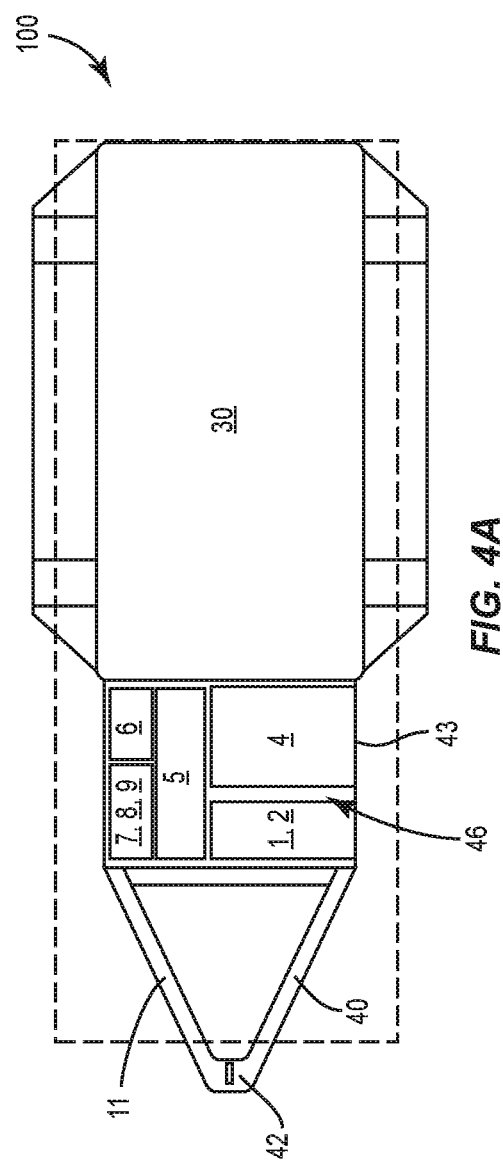

MOBILE PLATFORM FOR CHARGING ELECTRIC VEHICLES

RELATED APPLICATIONS

This application claims priority to U.S. Provisional Application No. 63/160,389 filed Mar. 12, 2021, and U.S. Provisional Application No. 63/194,317 filed May 28, 2021, the disclosures of which are incorporated herein by reference in their entireties.

BACKGROUND

Electrical vehicles use one or more electric motors for propulsion instead of internal combustion engines. These vehicles are becoming more common due in part to advances in technology that have increased distances that a vehicle can travel on a charge.

When using an electric vehicle, the vehicle operator is required to find a charging station to recharge the battery prior to the vehicle battery becoming completely drained of electrical power. Maintaining a charge on the battery is relatively easy when the operator is traveling in proximity of their home. Many homes are equipped with charging stations that provide the necessary charging. Further, the operator is aware of fixed utility power-based charging stations within their geographic area that are available for use when needed.

The use of electrical vehicles is more worrisome for travelers that are traveling greater distances away from their homes. For example, a traveler who is traveling a distance that is farther away than the range of the battery. This type of traveling requires that the operator find a charging station along their route. This is problematic causing the traveler to experience "range anxiety" because of the uncertainty of being able to find a charging station. The range anxiety is a result of relatively few charging stations that are currently available for travelers, the unknown aspect of whether a charging station will be available when needed (or if it is already being used by another traveler), and when a charge will be needed for the vehicle. This range anxiety has caused travelers to forgo long trips that require recharging of their vehicle. Range anxiety has also caused travelers to not purchase electric vehicles but rather stay with vehicles with internal combustion engines because of the ease in sourcing fuel while traveling a route.

A main focus of electric vehicle owners is to reduce the environmental impact caused by using a vehicle. Electric vehicles provide a solution for addressing climate change, as well as various other environmental issues that are caused by the use of internal combustion engines (e.g., fuel spills, destructive mining techniques). The use of electric charging stations to recharge the vehicles further forwards this cause of the vehicle owner as the environmental impact is greatly reduced. Further, producing the electric power at the location where the vehicle is being charged eliminates the large electric power grid losses. Recharging methods should focus on renewable energy solutions that include efficiently produced local power at the point of demand not reliant on massive electric transmission infrastructure costs to deploy charging systems. These systems may also provide environmentally sound medium term traditional grid reinforcement after natural disaster events that limit power grid stability and functionality.

SUMMARY

One aspect is directed to a mobile platform comprising a chassis configured to be pulled by a tow vehicle. A battery bank is positioned on the chassis. A renewable energy recharging device is positioned on the chassis to recharge the battery bank. A liquid fuel powered recharging device is positioned on the chassis to recharge the battery bank. An electrical terminal is operatively connected to the battery bank to deliver electric power from the battery bank to an electric vehicle. A fuel tank is positioned on the chassis to store liquid fuel. A fuel line extends from the fuel tank to deliver the liquid fuel.

In another aspect, the chassis comprises a frame with a hitch for engagement with the tow vehicle and wheels mounted to the frame.

In another aspect, the renewable energy recharging device comprises a solar panel that is mounted on a top of the fuel tank.

In another aspect, the fuel tank is physically larger than the battery bank.

In another aspect, the liquid fuel-powered recharging device comprises a fuel-powered generator.

In another aspect, the liquid fuel-powered recharging device comprises an electric generator comprising: a combustion engine; an exhaust port for gases produced by the combustion engine; and an exhaust hose comprising an elongated shape with first and second ends with the first end mounted to the exhaust port and with the exhaust hose extending through a floor in the chassis and with the second end positioned at the bottom side of the chassis.

In another aspect, the combustion engine of the electric generator operates on the liquid fuel that is stored in the fuel tank.

In another aspect, a muffler is mounted to the exhaust hose to suppress sound from the electric generator and with the muffler mounted to a bottom side of the chassis.

In another aspect, a sound chamber is mounted to the chassis and the second end of the exhaust hose terminates within the sound chamber.

In another aspect, a cabinet is positioned on the chassis and comprises an enclosed interior space with the liquid fuel-powered recharging device positioned within the interior space of the cabinet.

In another aspect, the renewable energy recharging device is a first renewable energy recharging device and further comprising a second renewable energy recharging device positioned on the chassis to recharge the battery bank.

One aspect is directed to a mobile platform comprising a wheeled chassis and a battery bank mounted on the chassis. A charge terminal is electrically connected to the battery bank and comprises a plug to charge electric vehicles. A generator is mounted on the chassis with the generator comprising an internal-combustion engine and configured to recharge the battery bank. A renewable energy charging device is mounted on the chassis to recharge the battery bank. A fuel tank is mounted on the chassis to store liquid fuel with the fuel tank comprising one or more fuel lines to dispense the liquid fuel to internal combustion vehicles.

In another aspect, a cabinet is mounted on the chassis and positioned between a front hitch of the chassis and the fuel tank.

In another aspect, a fuel line extends from the fuel tank to the fuel-power generator with the fuel line configured to supply the liquid fuel from the fuel tank to the fuel-powered generator.

In another aspect, the fuel tank is physically larger than the battery bank.

One aspect is directed to a method of charging vehicles with a mobile platform. The method comprises: towing the mobile platform from a first geographic location to a second geographic location; extending an electrical terminal from the mobile platform to an electric vehicle; supplying electrical energy from a battery bank on the mobile platform through the electrical terminal and to the electric vehicle; extending a fuel line from the mobile platform to an internal combustion engine vehicle; supplying liquid fuel from a fuel tank on the mobile platform through the fuel line and to the internal combustion engine vehicle; producing electrical energy through a renewable energy recharging device positioned on the chassis and recharging the battery bank; and powering a liquid fuel powered recharging device positioned on the chassis and producing electrical energy and recharging the battery bank.

In another aspect, the method further comprises supplying fuel from the fuel tank to the liquid fuel powered recharging device when a fuel level on the fuel powered recharging device falls below a predetermined level.

In another aspect, the method further comprises simultaneously supplying the electrical energy from the battery bank to the electric vehicle and supplying the liquid fuel from the fuel tank to the internal combustion engine vehicle.

In another aspect, the method further comprises simultaneously recharging the battery bank with the renewable energy recharging device and the liquid fuel powered recharging device.

In another aspect, producing the electrical energy through the renewable energy recharging device comprises producing the electrical energy through solar panels mounted on the chassis.

One example is directed to a mobile platform comprising a battery bank, one or more renewable energy recharging devices to recharge the battery bank, one or more fuel-powered recharging devices to recharge the battery bank, and a fuel tank to supply liquid fuel to the one or more fuel-powered recharging devices. A wheeled chassis supports the battery bank, the one or more renewable energy recharging devices, the one or more fuel-powered recharging devices, and the fuel tank. One or more electrical terminals are configured to deliver an electric charge from the battery bank to an electric vehicle.

In another example, one or more fuel output lines are configured to dispense fuel from the fuel tank to a fuel-powered vehicle.

In another example, the renewable energy recharging devices comprise solar panels and wind turbines.

In another example, the fuel tank is physically larger than the battery bank.

In another example, a fuel line extends from the fuel tank and comprises one or more filters for removing impurities from the fuel.

One example is directed to a mobile platform comprising a wheeled chassis. A battery bank is mounted on the chassis. One or more charge terminals are electrically connected to the battery bank and configured with a plug to mount to an electric vehicle to charge the electric vehicle. A fuel tank is mounted on the chassis. Renewable energy and fuel-powered recharging devices are mounted on the chassis to recharge the battery bank.

In another example, one or more fuel hoses extend from the fuel tank to deliver fuel from the fuel tank to a fuel-powered vehicle.

One example is directed to a mobile platform comprising a wheeled chassis comprising a top side and a bottom side, a fuel tank mounted on the top side of the chassis, an electric generator mounted on the top side of the chassis with the electric generator comprising a combustion engine and an exhaust port for gases produced by the combustion engine, and an exhaust hose comprising an elongated shape with first and second ends with the first end mounted to the exhaust port of the electric generator and with the exhaust hose extending through a floor in the chassis and with the second end positioned at the bottom side of the chassis.

In another example, the combustion engine of the electric generator operates on the fuel that is stored in the fuel tank.

In another example, a cabinet is mounted to the top side of the chassis with the cabinet comprising an enclosed interior space and with the electric generator positioned in the interior space.

In another example, the cabinet comprises a floor and the exhaust hose extends through the floor.

In another example, the exhaust hose comprises a double layer construction with an inner hose and an outer hose.

In another example, the exhaust hose is mounted to a muffler with the muffler mounted to the bottom side of the chassis.

In another example, a sound chamber is mounted to the chassis and with the second end of the exhaust hose terminating within the sound chamber.

One example is directed to a mobile platform comprising a wheeled chassis comprising a top side and a bottom side, a fuel tank mounted on the top side of the chassis, a cabinet mounted to the top side of the chassis with the cabinet comprising outer walls and a floor that form an interior space, an electric generator positioned in the interior space of the cabinet with the electric generator comprising a combustion engine, and an exhaust hose mounted to the electric generator and extending through the cabinet to exhaust gases produced by the combustion engine out of the interior space of the cabinet.

In another example, the exhaust hose comprises an elongated shape with first and second ends with the first end mounted to an exhaust port on the electric generator and with the exhaust hose extending through an opening in the cabinet and with the second end positioned outward away from the interior space of the cabinet.

In another example, the opening is in the floor of the cabinet.

In another example, the cabinet comprises one or more doors that are selectively positionable between open and closed positions.

In another example, the combustion engine of the electric generator operates on the fuel that is stored in the fuel tank.

In another example, the exhaust hose comprises a double layer construction with an inner hose and an outer hose.

In another example, a muffler is mounted to the exhaust hose with the muffler mounted to the chassis away from the cabinet.

In another example, a sound chamber is mounted to the chassis and with the second end of the exhaust hose terminating within the sound chamber.

In another example, the sound chamber comprises side walls that extend downward from the chassis and formed an interior space.

In another example, the interior space comprises an open side opposite from the chassis.

In another example, the side walls of the chamber are constructed from layers of different materials that each have a different sound absorption ability.

One example is directed to a mobile platform comprising a wheeled chassis comprising a top side and a bottom side, a cabinet mounted to the top side of the chassis with the cabinet comprising outer walls and a floor that form an interior space, an electric generator positioned in the interior space of the cabinet with the electric generator comprising a combustion engine, and an exhaust hose mounted to the electric generator and extending through the cabinet to exhaust gases produced by the combustion engine out of the interior space of the cabinet.

In another example, a sound chamber is mounted to the chassis and with the exhaust house terminating within the sound chamber.

In another example, the sound chamber is spaced away from the cabinet.

In another example, the sound chamber is mounted to the bottom side of the chassis.

In another example, the sound chamber comprises side walls that extend downward from the chassis and form an interior space.

In another example, the interior space comprises an open side opposite from the chassis.

In another example, the side walls of the chamber are constructed from layers of different materials that each have a different sound absorption ability.

In another example, a muffler is mounted to the exhaust hose with the muffler mounted to the chassis away from the cabinet.

In another example, the muffler is positioned along the exhaust hose between the cabinet and the sound chamber.

In another example, a fuel tank is mounted on the top side of the chassis.

The features, functions and advantages that have been discussed can be achieved independently in various aspects or may be combined in yet other aspects, further details of which can be seen with reference to the following description and the drawings.

BRIEF DESCRIPTION OF THE DRAWINGS

FIG. 4 is a side schematic view of a mobile platform.

FIG. 4A is a top schematic view of the mobile platform of FIG. 4.

DETAILED DESCRIPTION

The present application is directed to systems and methods of economically delivering electric vehicle charging functionality from a mobile platform. The mobile platform provides for moving and positioning at various desired geographical positions, such as positions at locations that can alleviate "range anxiety" for electric vehicle users. The mobile platform includes a battery bank for storing electrical energy. Charging terminals are electrically connected to the battery bank and provide for charging vehicles. The mobile platform also includes one or more charging devices to maintain a charge on the battery system. The charging devices are powered by renewable energy forms, such as solar and wind. When the renewable energy sources are not able to provide the adequate amount of charging, a low or near-zero emission back-up fuel powered generator provides the necessary charge on the battery. This redundant system reduces and/or eliminates the need for fixed infrastructure or utility based power for long term, high volume, high speed recharging.

Figure 1:
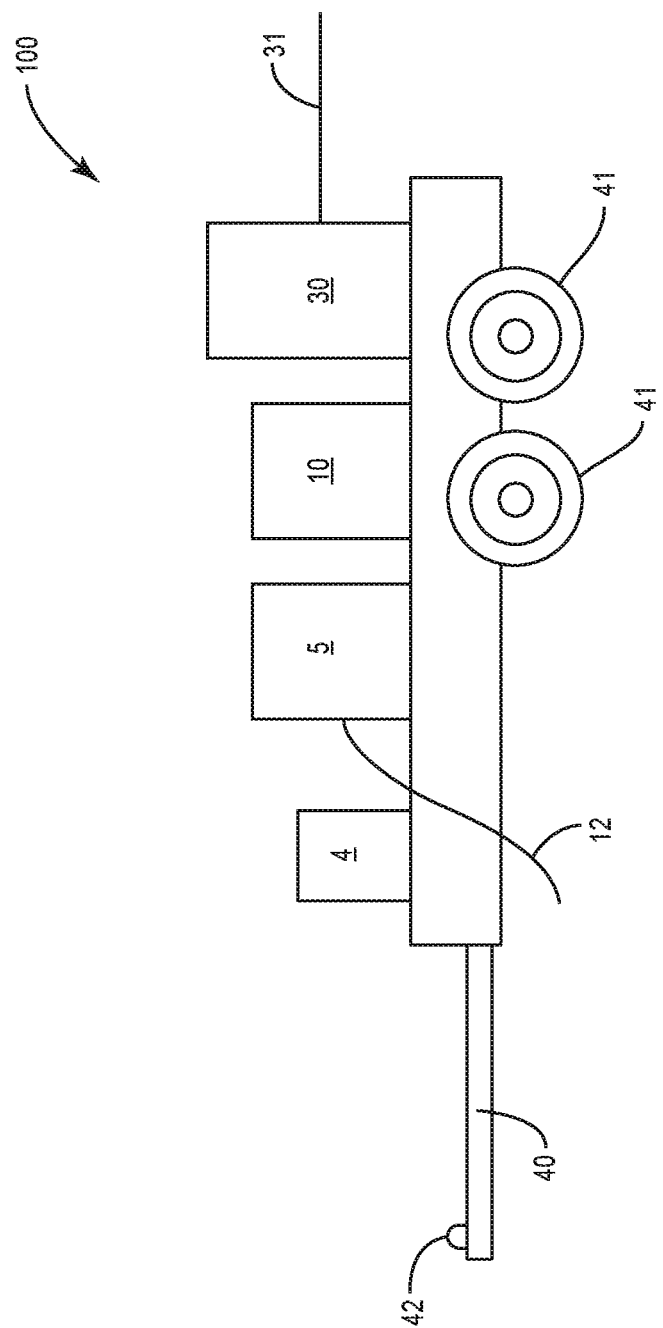
FIG. 1 is a schematic diagram of a mobile platform.

FIG. 1 illustrates a schematic representation of a mobile platform 100. The mobile platform 100 includes a battery bank 5 that stores electric energy. One or more charging terminals 12 are operatively connected to the battery bank 5 and are configured to plug into the electrical vehicles during charging. One or more renewable energy devices 10 provides power for charging the battery bank 5. The renewable energy devices 10 are powered by renewable energy sources that are net neutral or positive in terms of pollution and environmental impact. Examples include solar and wind power devices.

A fuel-power back-up generator 4 (hereinafter generator 4) also provides power for charging the battery bank 5. The generator 4 is used at times when the renewable energy devices 10 are not able to meet the charging demand on the battery bank 5. One or more fuel tanks 30 provide easy to access liquid fuel such as diesel and gasoline to run the generator 4.

The mobile platform 10 is mounted on a chassis 40 that supports each of the battery bank 5, renewable energy devices 10, generator 4, and fuel tank 30. The chassis 40 is configured to be pulled by a vehicle and includes wheels 41 or other like members (e.g., skids, tracks) that provide for the mobility.

Figure 2:
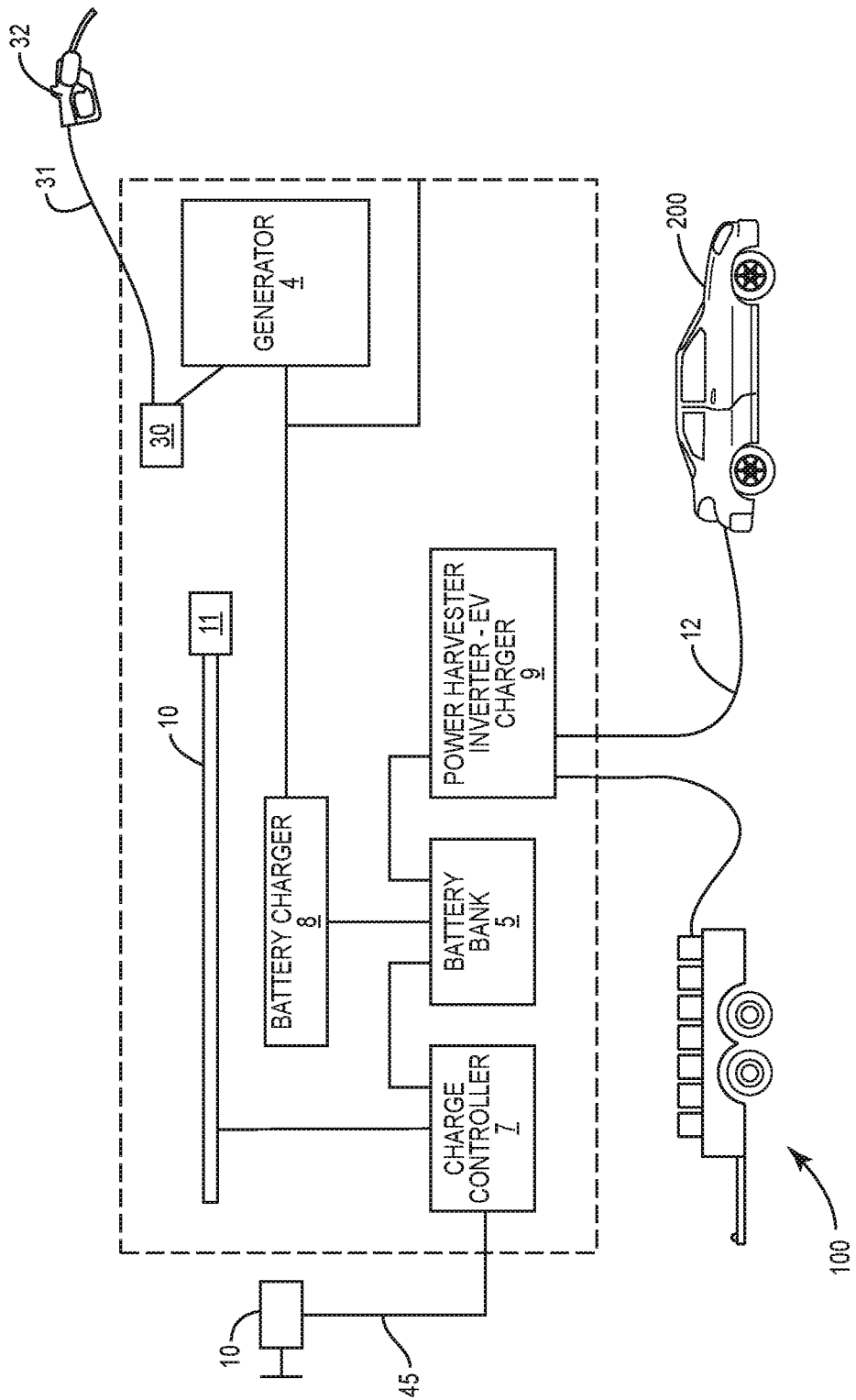
FIG. 2 is a schematic diagram of a mobile platform.

FIG. 2 schematically illustrates a mobile platform 100 for charging vehicles 200. The battery bank 5 is configured to provide electrical charging capability to supply electrical power to one or more vehicles 200. Multiple charge terminals provide for simultaneously charging multiple vehicles 200. The battery bank 5 can include a single battery or can include two or more separate batteries that are electrically connected together. In one example, the battery bank 5 includes multiple lithium-ion batteries that are electrically connected together. In another example, the batteries are lithium iron phosphate (LiFePO$_4$) batteries. These batteries include LiFePO$_4$ as the cathode material, and a graphititic carbon electrode with metallic backing as the anode. In one example, the battery bank 5 can include various other types of batteries suitable for multiple charge/discharge cycles.

One or more renewable energy devices 10 charge the battery bank 5. The renewable energy devices 10 can include one or more photovoltaic solar panels 10, wind turbines 10, or other methods of collecting energy. In one example, the solar panels 10 are mounted to the top of the mobile platform 100 to be exposed to the sun. The solar panels 10 can be attached to an adjustable frame 11 that is powered by a motor to adjust the angular position to increase the amount of sun exposure. The solar panels 10 can be folded into a protected orientation when not in use, such as when the mobile platform 100 is being transported between geographic locations.

In one example, one or more sides of the solar panels 10 are affixed in an array and mounted on the fuel tank 30. The solar panels 10 are attached at hinges that allow for folding and/or manual adjustment to position the panels 10 towards the sun. In one example, sides of one or more of the solar panels 10 are affixed to the top of the fuel tank 30 and also mechanically hinged together to provide for adjusting the positioning. In one example, the solar panels 10 are electrically, hydraulically, and/or mechanically powered to be adjusted to point more directly at the sun to gather more power or close. In one example, the solar panels 10 are adjusted electromechanically and or hydraulically using sensors to automatically point the panels 10 more directly at the sun to gather more power or close. In one example, the positioning of the solar panels 10 are controlled by a control unit 60. The control unit 60 can be connected to a network (e.g., Internet) to gain information used to determine the alignment and/or positioning (e.g., deployed, stored) of the solar panels 10. Information includes but is not limited to weather (e.g., hail, freezing rain, snow, high winds, tornedo).

In one example, electric resistance heating elements are attached on the back of a teflon or hydrophobic coated aluminum sheet attached to the back-side of the solar panels 10. When freezing rain or snow piles up after bad weather (on the closed array stack), the control unit 60 activates the heating elements to melt the snow or ice layer on the aluminum sheet and an electromechanical drive opens the solar panels 10. The ice or snow self-sheds off the solar panels 10 as the array re-deploys (from gravity and the thin layer of melted water between the aluminum and the snow and ice). This requires much less electric current than melting the entire ice/snow pack and the molecularly tied mass's self-shedding reduces the power required to redeploy (the array). With a small amount of power input the solar panels 10 are ice/snow free and the array is back to making power.

The wind turbines 10 can be mounted directly to one or more of the chassis 40, fuel tank 30, and cabinet 43. In another example, the wind turbines 10 are mounted on a retractable pole 45. During times when the wind turbine 10 is not producing electricity, the pole 45 is retracted inward against the chassis 40. For example, the pole 45 is retracted inward when the mobile platform 100 is being moved between locations. The pole 45 is extended to place the wind turbine 10 in an elevated position when producing electricity.

A charge controller 7 is positioned between the renewable energy devices 10 and the battery bank 5. In one example, the charge controller 7 takes the energy from the renewable energy devices 10 and converts the energy to be suitable for charging the battery bank 5. The charge controller 7 can also limit supplying overcurrent and overcharging the battery bank 5.

The generator 4 is powered by liquid fuel to provide electrical power for charging the battery bank 5. In one example, the generator 4 is powered by a linear, turbine, rotary, or Otto cycle engine and the liquid fuel transforms heat energy into mechanical energy to the generator 4 to provide electrical power for charging the battery bank 5. The generator 4 can be powered by various liquid fuels, such as gasoline, alcohol, and diesel. In one example, the generator 4 is configured to output electrical energy that is output to one or both of the battery bank 5 and a power harvester 9. In another example, the generator 4 powers a battery charger 8 that charges the battery bank 5.

The power harvester 9 controls the charge supplied to the one or more charging terminals 12. The power harvester 9 receives the charge from the battery bank 5 and supplies the charge to the one or more charge terminals 12. The power harvester 9 can also receive power from the generator 4 or other sources. The power harvester 9 can invert the charge for either AC or DC charging capabilities.

The charge terminals 12 extend from the power harvester 9 and are configured to plug into the electric vehicles 200. The charge terminals 12 can include cables of various lengths to reach the electric vehicles 200 that are in proximity to the mobile platform 100. Plugs are mounted at the ends of the cables for engaging the corresponding receptacles in the electric vehicles 200.

The mobile platform 100 is configured to accommodate different charging levels. Examples includes 4.6 kW, 7.2 kW, and 9.6 kW charging. The mobile platform 100 is further configured to provide for AC or DC charging with necessary voltages as required.

The fuel tank 30 provides fuel to power the generator 4. The fuel tank 30 can be configured to hold various types of fuel, such as but not limited to diesel, alcohol, and gasoline fuels. The size of the fuel tank 30 can vary. In one example, the fuel tank 30 is sized to hold about 900 gallons of fuel. In another example, the fuel tank 30 is sized to hold about 500 gallons of fuel. The fuel tank 30 can include a single receptacle for holding the fuel, or two or more separate receptacles each configured to hold fuel. In one example, additional smaller tanks hold other fluids as needed, such as lubricating oil, grease, coolants, detergents, fuel additives, and diesel exhaust fluid (DEF). In one example, the fuel tank 30 is larger than the battery bank 5 and takes up a greater space on the chassis 40.

In addition to providing fuel to the generator 4, one or more fuel outlets 31 extend from the fuel tank 30 for dispensing fuel to vehicles 200 with internal combustion engines. The vehicles 200 can include both hybrid and traditional vehicles with internal combustion engines. In one example, the other fluids can also be dispensed to the vehicles 200. The outlets 31 include a hose and a nozzle 32 at a distal end for controlling the flow of fuel and other vehicle fluids needed for their operation.

In one example, the fuel tank 30 is part of a fuel system that includes one or more pumps 3, and one or more filters 1, 2. Fuel is moved from the fuel tank 30 by the pump 3 and through the filters 1, 2. The fuel can then be dispensed through one or more of the outlets 31. Alternatively or additionally, the fuel can be returned to the fuel tank 30 for later use.

Figure 3:
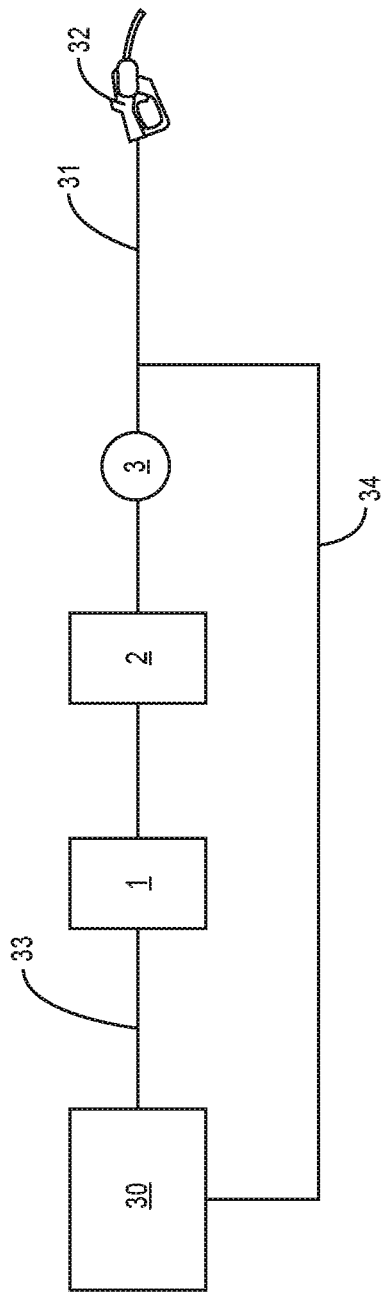
FIG. 3 is a schematic diagram of a fuel system of a mobile platform.

FIG. 3 schematically illustrates a system for moving fuel within the mobile platform 100. The fuel is stored in the tank 30 and moved with a pump 3 into a fuel line 33 and through one or more filters 1, 2. The fuel can move into the outlet 31 and be dispensed through the nozzle 32. Alternatively or additionally, a portion or all the fuel can be moved through a return line 34 back into the fuel tank 30. The process of moving the fuel along the fuel line 33 and filters 1, 2 maintains the fuel in ready condition for use with the generator 4 and/or dispensing through the nozzle 32 to a vehicle 200. This process also maintains the condition of the fuel and remove impurities in the fuel that are known to harm engines.

Various types of filters 1, 2 can be used along the fuel line 33. The filters 1, 2 can be configured to remove various particulates in the fuel, including but not limited to scale, mud, debris, bacteria and mold. In one example, one or both filters 1, 2 are configured to remove particulates greater than 2 microns from the fuel. In one example, an upstream filter is configured to remove larger particulates and the downstream filter is configured to remove smaller particulates. One or both filters 1, 2 can be configured to separate water from the fuel, such as a coalescing filter that removes the water from the fuel, and a water absorbing filter that absorbs the water in the fuel.

In one example, the mobile platform 100 is configured to dispense fuel at a flow rate of between 20-40 gallons/minute. In one example, the fuel system includes one or more pumps 3 that provide a pressure of about 25-30 psi.

Figure 15:
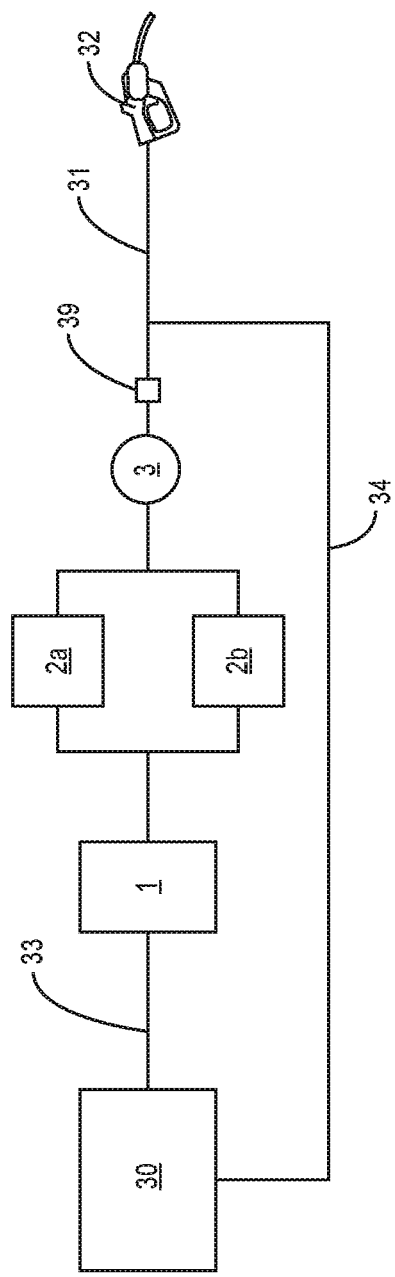
FIG. 15 is a schematic diagram of a fuel system of a mobile platform.

In one example as illustrated in FIG. 15, the fuel system includes two filtrations that each can be accomplished by one or more filters 1, 2. In one example, the first filtration is a large particulate filter 1 with a minimum beta rating of 50. The one or more filters 1 in the first filtration are composed of pleated, dual composition fiberglass and/or celluloid material to provide primary extraction of particulates from two microns and upward. The second downstream filtration is split into two independent composite filters 2a, 2b that include a secondary particulate filtration down to 0.5 microns in size with a beta rating of 6. The second filtration also provides for water extraction filtration using a super absorbent polymer that provides a total water in the fuel to be below 10 parts per million (ppm). In one example, the two filters 2a, 2b provide for both particulate and water filtration. In another example, a first set of filters 1 provides for particulate removal and a second set of filters 2 provides for water removal.

In one example, splitting of the fuel flow to two independent filters 2a, 2b lessens pressure in the system. This lesser pressure provides for the filters 2a, 2b to become more efficient. The redundant filters also provide for dispensing fuel if one of the two filters 2a, 2b reaches its saturation point and blocks fuel movement along its branch of the fuel line.

The fuel system can also include a fuel contaminant detection analyzer 39. The analyzer 39 samples the fuel flow to give real-time readings of particulates and/or water in the fuel to a control unit 60. This can also provide for historic documentation to verify the cleanliness of the fuel that is dispensed as it relates to both particulate and water content. This validates and documents the fuel quality having met the power plant manufacturer's specifications during operation. In the ignition process of internal combustion engines, fuel contamination is a known impediment to clean efficient operation. Clean fuel promotes thermal efficiency, more power, and lower emissions in all currently used internal combustion engines. Flame cleanliness effects flame kernel initiation and development that are essential to a successful combustion process. Particularly under lean burn/EGR diluted conditions.

The mobile platform 100 is configured to be moved by a tow vehicle. The chassis 40 includes a hitch device 42 to be connected to a vehicle that can pull the mobile platform 100 to the desired geographic location. The size of the mobile platform 100 provides for moving along various roads. In one example, the mobile platform 100 includes a total weight of less than 10,000 lbs. when the fuel tank 30 is full of fuel. This provides for the mobile platform 100 to be towed by a wider range of vehicles. This can also provide for the mobile platform 100 to be towed by a driver that does not have a Commercial Drivers License (CDL).

As illustrated in FIGS. 4 and 4A, the mobile platform 100 includes a sleek design. A mechanical cabinet 43 is mounted on the chassis 40 and includes an interior space 46 that houses various components. The cabinet 43 can include one or more doors to allow access to the interior space 46 to access the components for use and servicing as needed. The front of the chassis 40 includes the hitch device 42 for mounting to a tow vehicle.

The mobile platform 100 is configured for charging one or more electric vehicles 200. The mobile platform 100 can include one or more charging terminals 12 to charge a single vehicle 200, or simultaneously charge multiple vehicles 200. Further, the mobile platform 100 can include one or more fuel outlets 31 for providing fuel to vehicles 200.

The mobile platform 100 is configured to operate using the power stored in the battery bank 5, and the recharging abilities of the renewable energy devices 10 and the generator 4. The mobile platform 100 can also be paired with a with a second mobile platform 13 for additional charging capacity.

Figure 5:
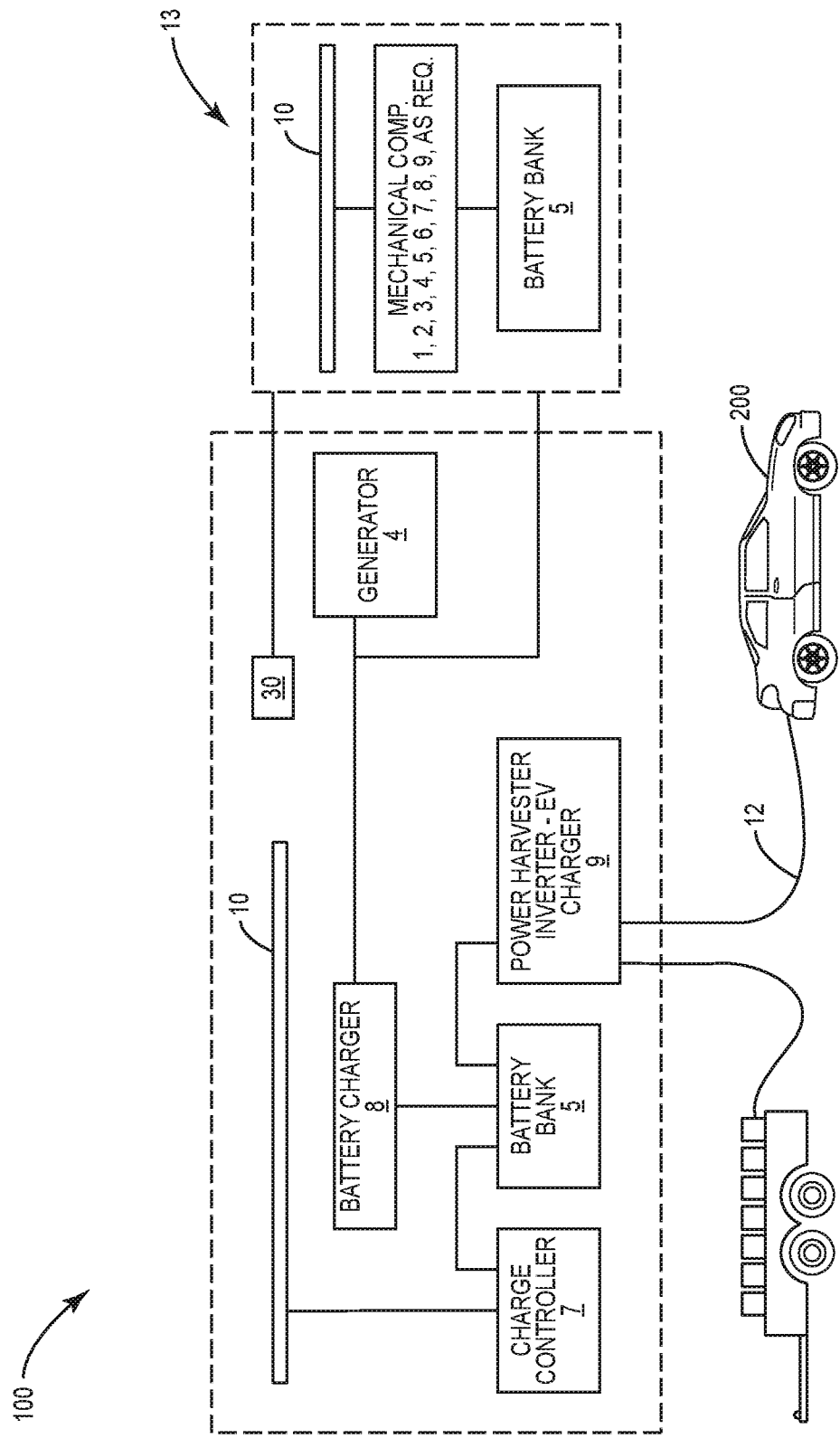
FIG. 5 is a schematic diagram of a mobile platform operatively connected to a second mobile platform.

FIG. 5 illustrates the mobile platform 100 connected to a second mobile platform 13. The second mobile platform 13 includes additional electric capacity that can be transferred to the mobile platform 100 and/or dispensed directly to electric vehicles 200 to increase charging capacity. The second mobile platform 13 does not include fuel, but rather obtains fuel from the mobile platform 100. The second mobile platform 13 is also configured to be moved by a vehicle both in tandem with the first platform 100 and as a single stand-alone unit to different geographic locations as necessary and as required by law (e.g., some jurisdictions do not allow for tandem trailers and therefore this configuration would not be feasible at these locations).

Figure 6:
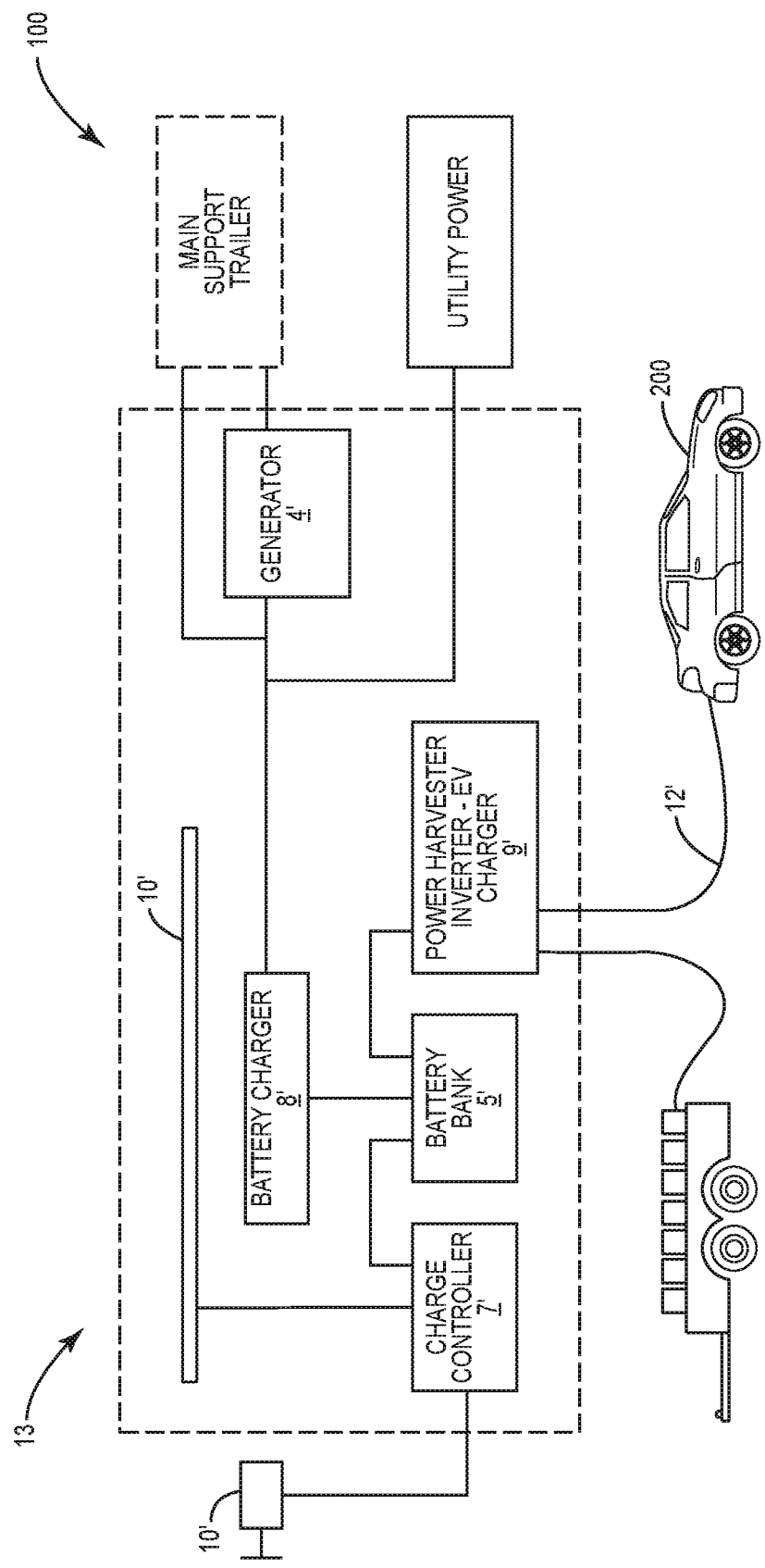
FIG. 6 is a schematic diagram of a second mobile platform operatively connected to a mobile platform.

FIG. 6 schematically illustrates the second mobile platform 13 connected to the mobile platform 100. The second mobile platform 13 includes a battery bank 5'. In one example, the battery bank 5' has a greater capacity than the battery bank 5 in the mobile platform 100. This is possible because the battery bank 5' occupies the additional space on the chassis 40' that is not otherwise taken by a fuel tank 30. The battery bank 5' is charged by one or more renewable energy devices 10', such as solar panels, wind turbines, or other energy sources. The number of renewable energy devices 10' can vary. A charge controller 7' is positioned between the renewable energy devices 10' and the battery bank 5' and functions in a similar manner as the charge controller 7 on the mobile platform 100. One or more generators 4' also provide for powering a battery charger 8' for charging the battery bank 5' and/or providing power directly to the power harvester 9'. The generator 4' obtains fuel from the mobile platform 100 to operate.

The second mobile platform 13 includes one or more charging terminals 12' for charging electric vehicles 200. Additionally or alternatively, the second mobile platform 13 transfers electrical power to the battery bank 5 and/or power harvester 9 in the mobile platform 100.

As with the mobile platform 100, the second mobile platform 13 recharges the battery bank 5' using the one or more renewable energy devices 10'. If the renewable energy devices 10' are not able to meet the charging demands, the one or more generators 4' are powered to provide the additional needed energy.

In one example, the components of the second mobile platform 13 are basically the same as the mobile platform 100. The exception is the second mobile platform 13 does not include a fuel tank 30. In one example, the chassis 40, 40' of the two devices 100, 13 is the same. This provides for manufacturing a single chassis design that can be used in multiple different contexts. Further, one or more of the components for charging are the same on the two platforms 100, 13 and can be positioned and attached to the chassis 40, 40' in the same manner.

Figure 7:
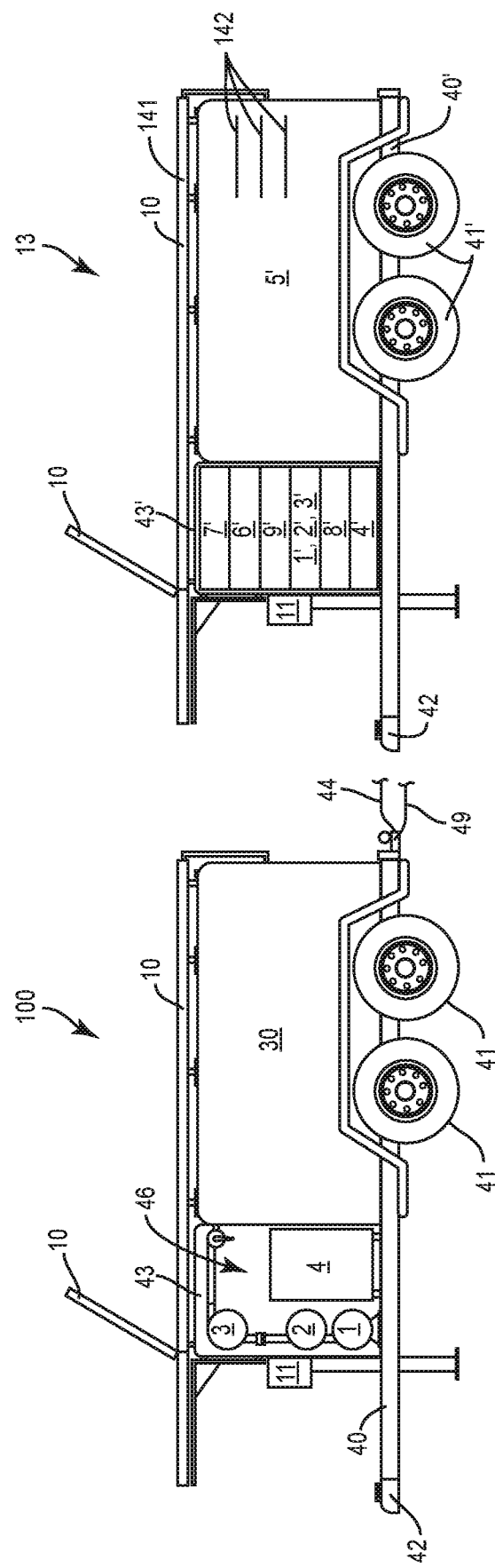
FIG. 7 is a side schematic view of a mobile platform operatively connected to a second mobile platform.
Figure 8:
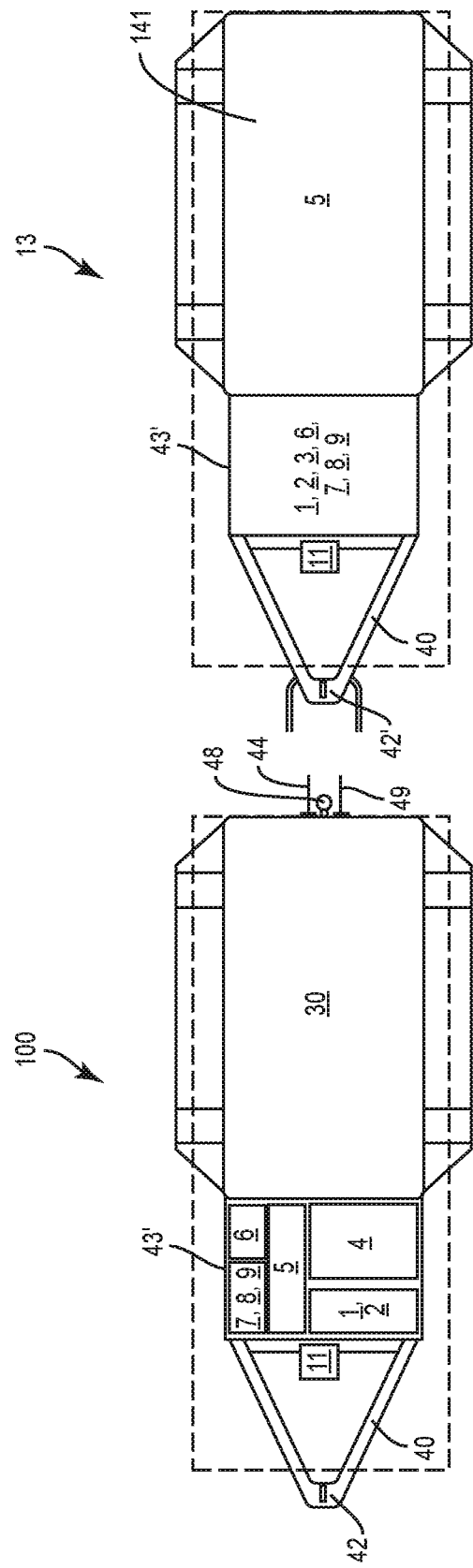
FIG. 8 is a top schematic view of FIG. 7 of the mobile platform operatively connected to a second mobile platform.

FIGS. 7 and 8 illustrate schematically the mobile platform 100 connected to the second mobile platform 13. The mobile platform 100 includes a fuel line 44 that extends outward and provides fuel to the second mobile platform 13. This fuel line 44 is operatively connected to the generator 4'. The mobile platform 100 also includes electrical wiring 49 that connects to the second mobile platform 13 to receive electrical power that can be dispensed from the mobile platform 100.

The second mobile platform 13 is configured to be connected to the rear of the mobile platform 100 and/or connected to a tow vehicle. The second mobile platform 13 includes a hitch 42' that can connect to a hitch 48 on the rear of the mobile platform 100 or a tow vehicle. The second mobile platform 13 includes a chassis 40' that supports the various components. The chassis 40' includes wheels 41' or other like devices for moving the second mobile platform 13. In one example, a mechanical cabinet 43' in the front of the second mobile platform 13 houses some of the components. The battery bank 5' is the largest component and takes up a majority of the space on the chassis 40'. The battery bank 5' can be housed in a separate cabinet 141 and include racking trays 142 that hold the battery piles that form the battery bank 5'.

Figure 9:
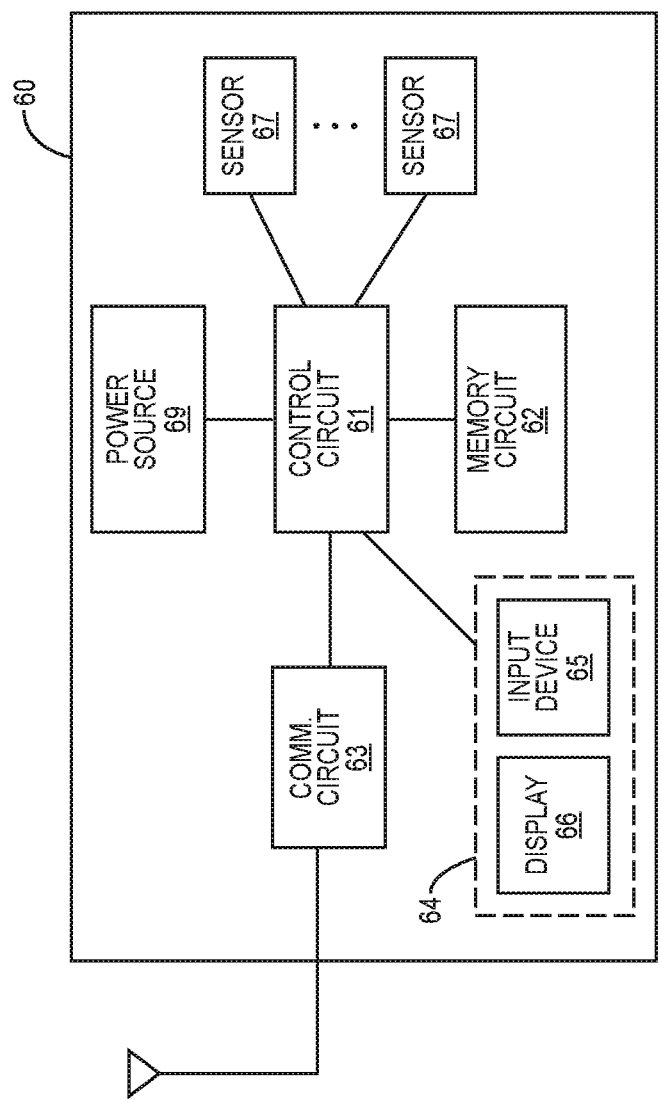
FIG. 9 is a schematic diagram of a control unit.

The mobile platform 100 includes a control unit 60 as illustrated in FIG. 9. The control unit 60 controls the operation of the mobile platform 100 and the connected second mobile platform 13. The control unit 60 includes a control circuit 61 and a memory circuit 62. The control circuit 61 controls overall operation of the mobile platform 100 and/or second mobile platform 13 according to program instructions stored in the memory circuit 62. The control circuit 61 can include one or more circuits, microcontrollers, microprocessors, hardware, or a combination thereof. Memory circuit 62 includes a non-transitory computer readable storage medium storing program instructions, such as a computer program product, that configures the control circuit 61 to implement one or more of the techniques discussed herein. Memory circuit 62 can include various memory devices such as, for example, read-only memory, and flash memory. Memory circuit 62 can be a separate component as illustrated in FIG. 9 or can be incorporated with the control circuit 61. Alternatively, the control circuit 61 can omit the memory circuit 62, e.g., according to at least some embodiments in which the control circuit 61 is dedicated and non-programmable.

The control unit 60 is configured to provide for communication functionality for travelers in need of charging their electric vehicles 200. Communications can include both incoming and outgoing communications. A communications circuit 63 provides for this communication functionality and enables communication over a communication network. The communications circuit 63 can include one or more interfaces that provide for different methods of communication. The communications circuit 63 can include a cellular interface that enables communication with a mobile communication network (e.g., a WCDMA, LTE, WiMAX, or other radio communications network). The communication circuit 63 can include a WLAN interface configured to communicate with a local area network, e.g., via a wireless access point. An exemplary WLAN interface could operate according to the 802.11 family of standards, which is commonly known as a WiFi interface. The communication circuit 63 can further include a personal area network interface, such as a Bluetooth interface. The communication circuit 63 can also include a Near Field Communication interface that provides for short-range wireless connectivity technology that uses magnetic field induction to permit devices to share information with each other over short distances.

In one example as illustrated in FIG. 9, the communications circuit 63 is incorporated into the control unit 60. In another example, the communications circuit 63 is a separate system that is operatively connected to and controlled by the control unit 60.

A user interface 64 provides for an operator to control one or more aspects of the mobile platforms 100, 13. The operator can include the traveler that is given instructions on how to use the mobile platform 100, 13 and/or a trained technician that operates the equipment. The user interface 64 can include one or more input devices 65 such as but not limited to a keypad, touchpad, roller ball, and joystick. The one or more input devices 65 provide for the traveler to enter commands to the control circuit 61. The user interface 64 can also include one or more displays 66 for displaying information to the traveler. The user interface 64 can also include a communication device that provides for communicating with the remote entities.

One or more sensors 67 detect different aspects of one or both platforms 100, 13. The data from the one or more sensors 67 can be stored in the memory circuit 62. One or more sensors 67 various aspects of the components of the mobile platforms 100, 13 including but not limited to the charge remaining on the battery banks 5, 5', production capacity of the renewable energy charging devices 10, 10' and amount of fuel remaining in the fuel tank 30. One or more sensors 67 can also determine aspects about the mobile platforms 100, 13 and its environment, such as the directional orientation, temperature, light sensor to detect an amount of sunlight, wind speed indicator, and geographic location (e.g., GPS sensor). A power source 69 provides power to the mobile platforms 100, 13. In another example, power is obtained from the battery banks 5, 5'.

In one example, each of the mobile platform 100 and second mobile platform 13 include their own control units 60 that control their operation. In another example, the mobile platform 100 includes a control unit 60 and the second mobile platform 13 includes no or limited processing capability with no or limited functionality. The limited processing capability of the platform 13 can include a basic control circuit, memory circuit, and communication circuit to send and receive messages with the mobile platform 100 and/or a remote server 80.

Figure 10:
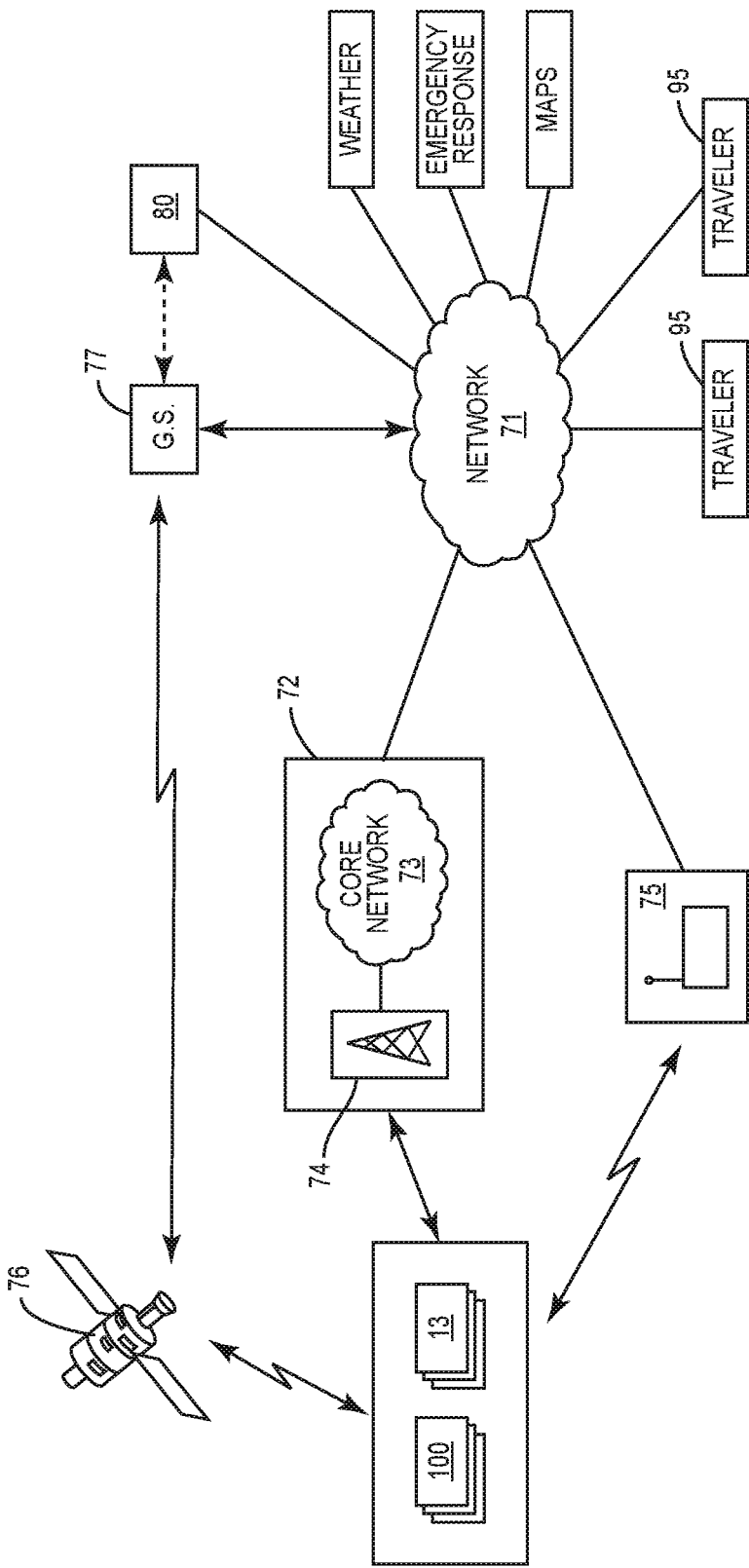
FIG. 10 is a schematic diagram of a communications network.

The mobile platform 100 is configured to communicate with travelers, remote server 80, and various other nodes over a wireless communication network 70 as illustrated in FIG. 10. The wireless communication network 70 includes a packet data network (PDN) 71. The PDN 71 can include a public network such as the Internet, or a private network. The wireless communications network 70 can include a mobile communication network 72 (e.g., a WCDMA, LTE, or WiMAX network). The mobile communication network (MCN) 72 includes a core network 73 and a radio access network (RAN) 74 including one or more base stations. The MCN 72 can be a conventional cellular network operating according to any communication standards now known or later developed. For example, the MCN 72 can comprise a Wideband Code Division Multiple Access (WCDMA) network, a Long Term Evolution (LTE) network, or WiMAX network. The MCN 72 is further configured to access the packet data network (PDN) 71.

The communications circuits 63 can also communicate through a Wireless Local Area Network (WLAN) 75 that operates according to the 802.11 family of standards, which is commonly known as a WiFi interface. Communications can also be available through one or more satellites 76. The satellites 76 can communicate through one or more of ground stations 77 to the PDN 71 or directly to one or more of the nodes.

Figure 11:
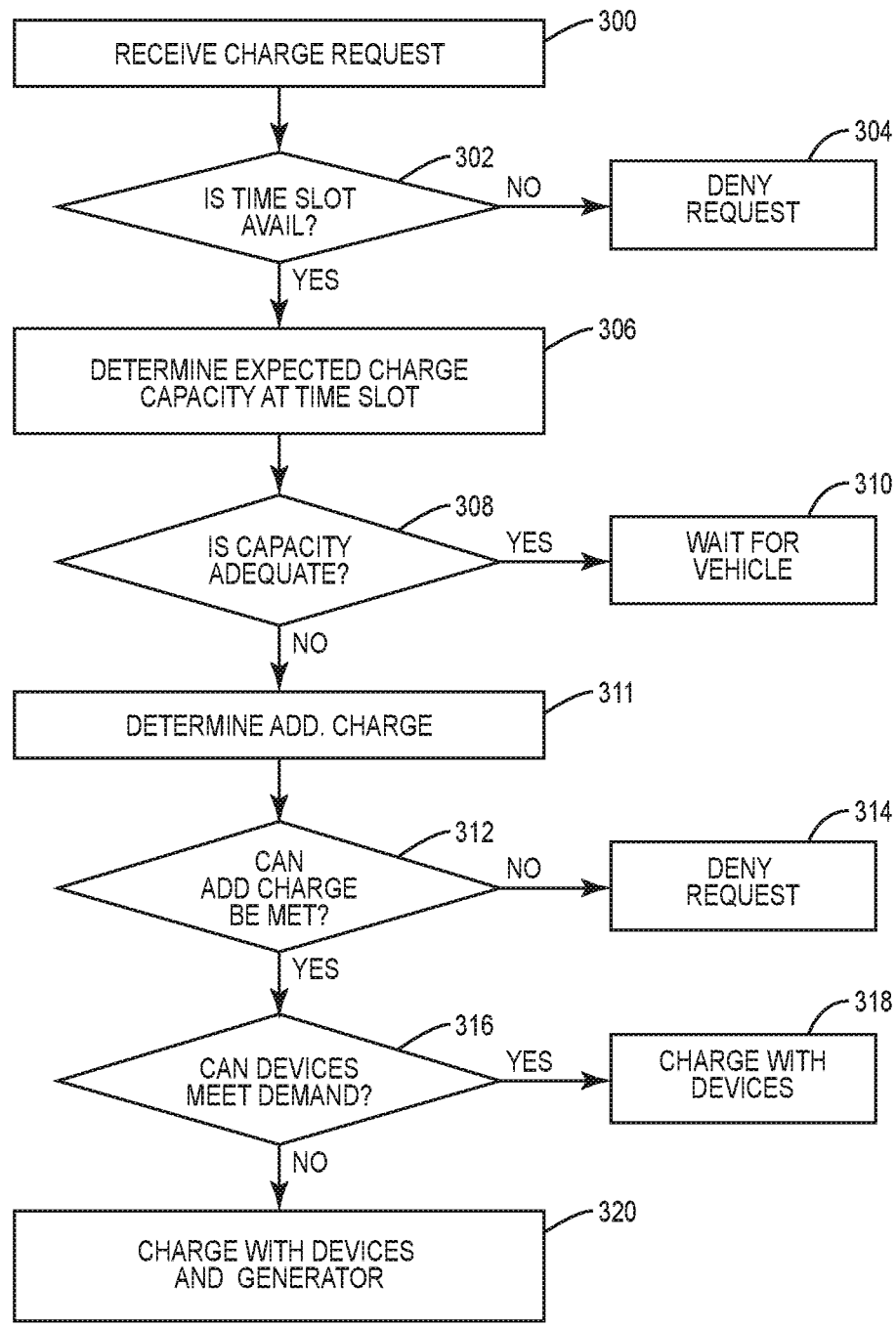
FIG. 11 is a flowchart diagram of a method of handling a charge request at a mobile platform.

When a traveler requires charging, the traveler contacts the mobile platform 100 through the wireless communication network 70. In one example, the traveler is required to establish an account prior to utilizing the platform 100. FIG. 11 illustrates a method of the mobile platform 100 receiving a charge request. The charge request received at the mobile platform 100 includes one or more of the amount of charging required, the geographic location where charging is needed, and the time the charging is needed (block 300). The control unit 60 determines whether the time is available for charging (block 302). This includes determining whether each of the charge terminals 12 will be in use during the requested time. If there is no capacity, the charge request will be denied (block 304). An alternate time may be offered to the traveler.

If the requested time is available, the control unit 60 determines the expected charge capacity of the battery bank 5 at that requested time (block 306). This can include a calculation of the current capacity when the charge request is received, and the expected number of charging events that will occur prior to the requested time. If the expected capacity is adequate to cover the charge request (block 308), the charge request is accepted and the traveler is notified. The control unit 60 waits for the time of the request as adequate charge is available in the battery bank 5 to handle the request (block 310).

If the current capacity and expected use is not adequate (block 308), a determination is made of the additional amount of charging necessary to meet the charge request (block 311). If the necessary amount cannot be produced prior to the requested time, the charge request is denied (block 314). If the necessary charge amount can be produced, it is determined whether the additional amount can be produced by renewable energy devices 10 (block 316). If this can occur, the battery bank 5 is charged with the renewable energy devices 10 (block 318).

If the renewable energy devices 10 are not adequate to meet the demand, the battery bank 5 is charged with both renewable energy devices 10 and the generator 4 (block 320). In one example, the generator 4 is used just enough to supplement the renewable energy devices 10 to meet the required demand. In one example, renewable energy devices 10 may not be available to provide charging capacity. For example, if charging is needed at night and solar panels are not effective, or during a period of time with no wind when wind turbines are ineffective. During these times, if demand or inclement circumstances require such as after a hurricane or natural disaster, the charging may occur completely through the generator 4.

In one example, the control unit 60 accesses information through the communication network 70 to determine whether the renewable energy devices 10 can meet the demand. This can include accessing the weather forecast to determine the amount of sunlight and/or wind. These inputs can then be used to more accurately calculate the expected amount of power that can be produced to charge the battery bank 5.

The control unit 60 can also contact emergency services in the event of an occurrence involving the platform 100, 13. Further, emergency services can have access to some or all of the information at the mobile platform 100 when responding to an event.

In one example, a remote server 80 oversees the charging operations of one or more mobile platforms 100. The remote server 80 monitors the status of the mobile platforms 100, receives the charge requests from the travelers, and determines how to accommodate the travelers.

Figure 12:
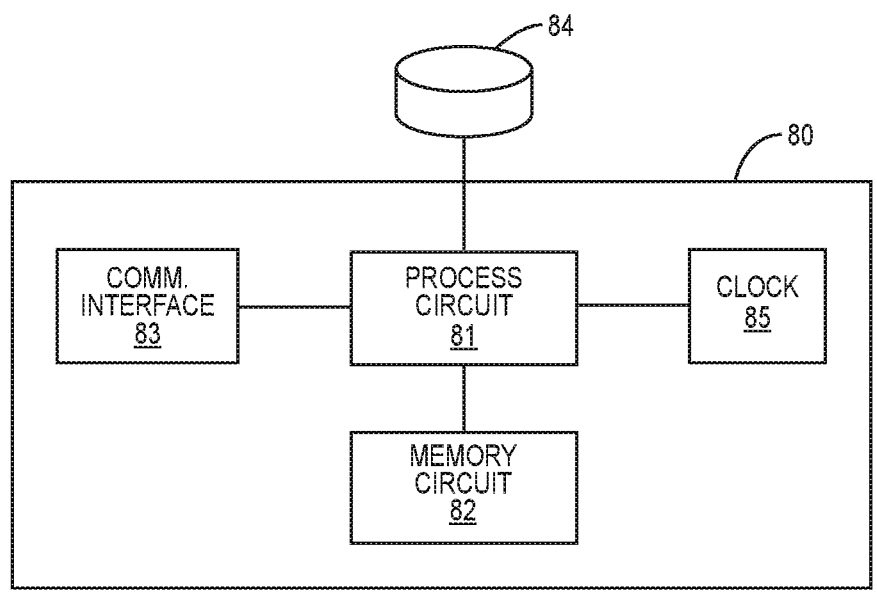
FIG. 12 is a schematic diagram of a server.

As illustrated in FIG. 12, the server 80 includes one or more processing circuits (illustrated as processing circuit 81) that may include one or more microprocessors, microcontrollers, Application Specific Integrated Circuits (ASICs), or the like, configured with appropriate software and/or firmware. A computer readable storage medium (shown as memory circuit 82) stores data and computer readable program code that configures the processing circuit 81 to implement the techniques described above. Memory circuit 82 is a non-transitory computer readable medium and may include various memory devices such as random access memory, read-only memory, and flash memory. A communications circuit 83 connects the server 80 to the PDN 71 and can be configured to communicate with the PDN 71 according to one or more 802.11 standards. The communications circuit 83 can support a wired connection (e.g., Ethernet), a wireless connection, or both. A database 84 stores information about the platforms 100, 13, and travelers. The database 84 is stored in a non-transitory computer readable storage medium (e.g., an electronic, magnetic, optical, electromagnetic, or semiconductor system-based storage device). The database 84 can be local or remote relative to the server 80. A clock 85 can measure various timing requirements regarding the use of the platforms 100, 13. The clock 85 can be incorporated with the processing circuit 81 or can be a separate component independent from the processing circuit 81.

The server 80 monitors aspects about the platforms 100, 13 and maintains a record for each platform 100, 13 in the database 84. The records can include aspects about the platforms 100, 13, such as but not limited to model number, date of manufacture, charge capacity of the battery banks 5, 5', size of the fuel tank 30, charging capacity of the renewable energy devices 10, 10', charging capacity of the generators 4, 4', and weight. The database 84 can also maintain the current status of the platforms 100, 13 such as but not limited to geographic location, amount of charge in battery banks 5, 5', and amount of fuel in the fuel tank 30. The control units 60 periodically transmit this information to the server 80 to maintain a current and accurate record of the status. Additionally or alternatively, the server 80 can query the control units 60 for information.

The server 80 can also monitor the status of the platforms 100, 13 to track their performance. This can include but is not limited to functionality, filter cleanliness status, battery age, and performance. For example, if a battery bank 5 is unable to hold a charge about a predetermined amount, or a renewable energy device 10 is not able to provide a predetermined charging capacity, the server 80 may indicate these issues and provide for them to be replaced and/or removed from use.

The server 80 can also maintain an account for each traveler that is using a mobile platform 100, 13. A traveler can create an account prior to using a platform 100, 13. The account can include the travelers name, address, type of electric vehicle, charging requirements, type of fuel, billing information, etc. Once established, the traveler is able to charge their electric vehicle 200 at one of the platforms 100, 13.

The server 80 is configured to provide a web interface for access by a traveler to create an account, request a charge, and determine the status the ability to charge their vehicle 200. The server 80 is configured with a browser-based interface or an applications program interface (API). The browser-based interface can include a website through which the contents of the database 84 can be accessible. Although the website can be hosted by the server 80, it can also be hosted at another location accessible through the PDN 71.

Travelers can access the server 80 through a variety of devices 95. The devices 95 can include laptop computers, personal computers, personal digital assistants, mobile computing/communication, tablet devices, and various other-like computing devices. Each of the travelers uses a respective device 95 and accesses the server 80 through the PDN 71, or alternatively some other network. In one embodiment, one or more of the entities can use his or her respective device 95 to access the server 80 through a separate portal. Each traveler's portal can include a secure interface to access the information that is assigned to them. The server 80 accesses the traveler's records and determines one or more platforms 100, 13 that can provide charging for the traveler.

Figure 13:
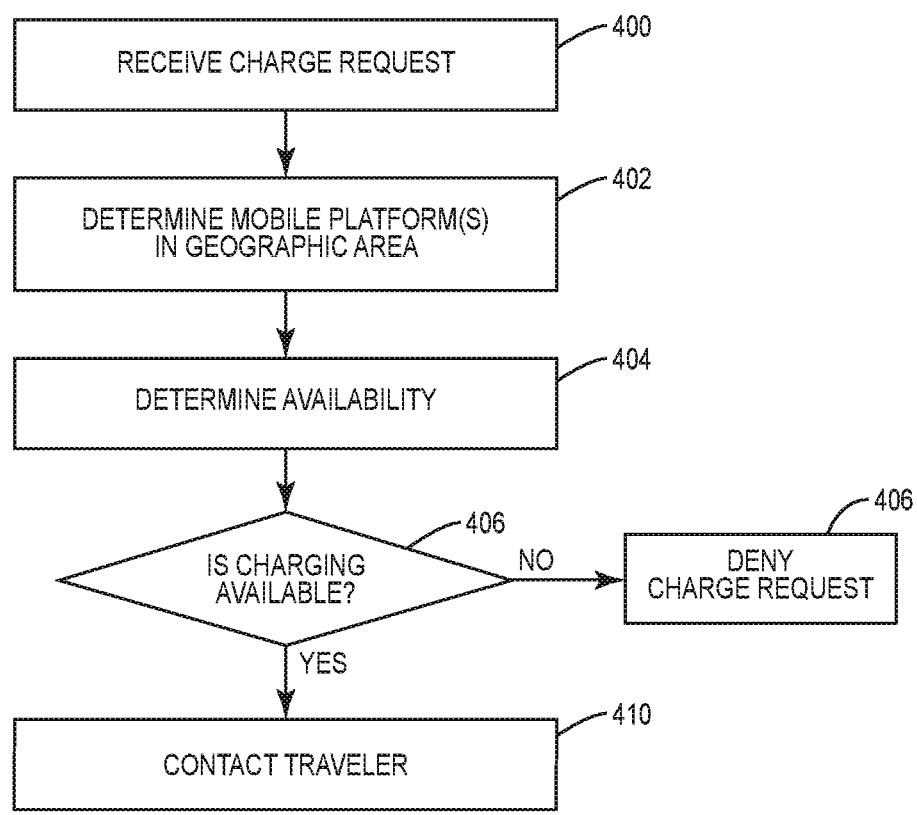
FIG. 13 is a flowchart diagram of a method of handling a charge request at a server.

FIG. 13 illustrates a method of the server 80 handling a charge request from a traveler. In this example, the server 80 monitors a network of mobile platforms 100 that are deployed at different locations within a geographic area. The charge request is received by the server (block 400). The charge request includes the amount of charge required, the geographic location, and the time needed.

Upon receiving the request, the server 80 determines one or more mobile platforms 100 that are in the desired geographic area (block 402). This can include determining the mobile platforms 100 that are within a particular range, such as within a predetermined number of miles of the requested location.

The server 80 then determines the availability of these mobile platforms 100 to meet the demands of the request (block 404). These demands include being available during the requested time and having the necessary charging capacity. If charging is not available (block 406), the server 80 notifies the traveler and denies the charge request (block 408). If charging is available, the server 80 notifies the traveler and confirms the request (block 410). The server 80 can also notify the mobile platform 100 and reserve the time for the traveler for the charging event.

In one example upon receiving the request and determining the applicable mobile platforms 100 in the geographic area, the server 80 sends a request to the mobile platform 100. The mobile platform 100 then determines whether it can accommodate the charge request in a manner described above for FIG. 11. The mobile platform 100 then signals the server 80 who can communicate with the travelers. In another example, the determination of the capacity of the mobile platform 100 is performed by the server 80 based on information received from the mobile platform 100.

Figure 14:
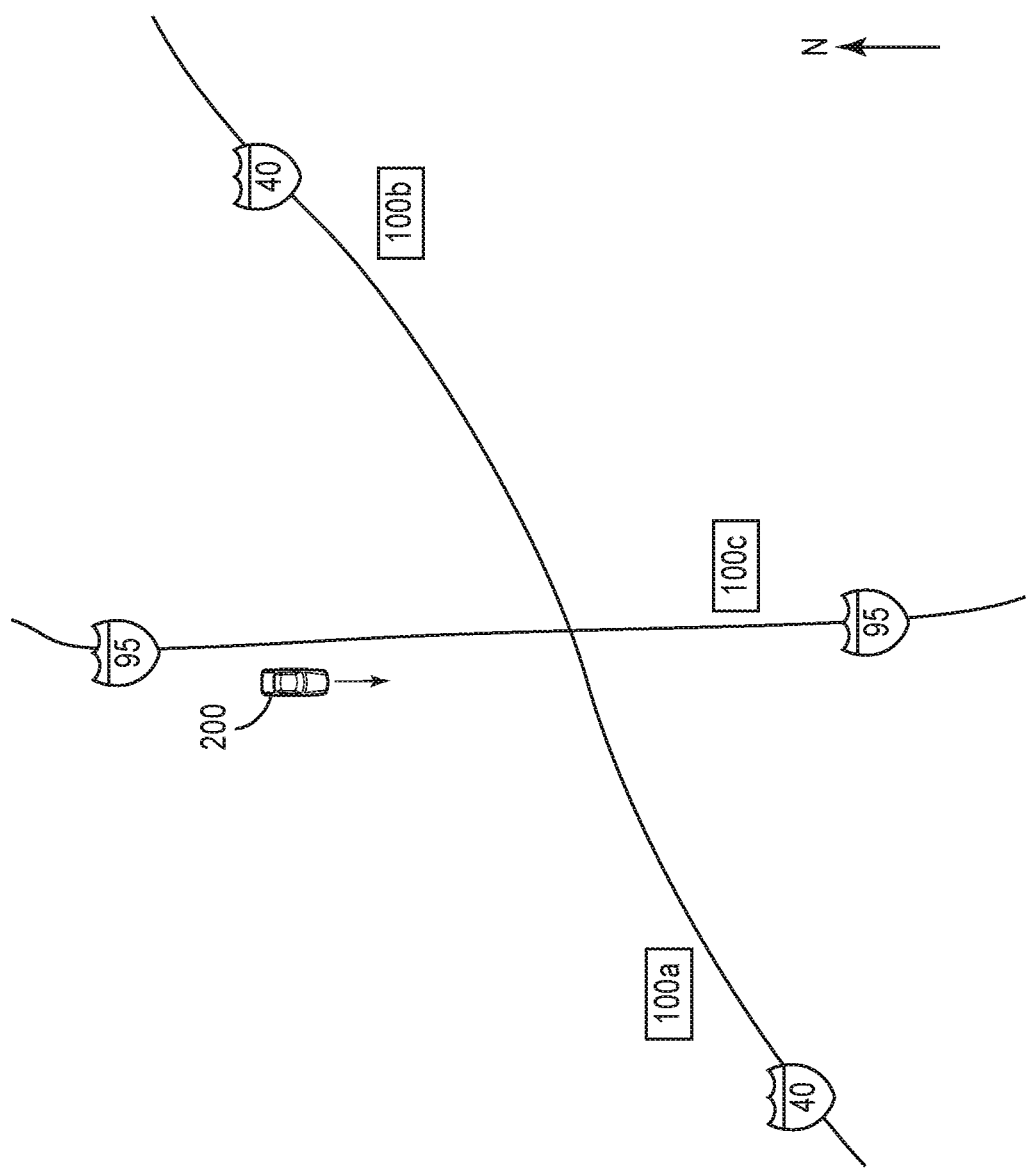
FIG. 14 is a schematic diagram of mobile platforms that form a network that can accommodate a traveler.

FIG. 14 illustrates one example of a traveler T traveling south on Interstate 95. The traveler contacts the server 80 requesting charging of their vehicle 200 within the near future. Upon receiving the charging request, the server 80 determines the one or more mobile platforms 100 in the geographic area. The server 80 determines their capacity, whether the request can be accepted, and then signals the traveler back. The traveler can then choose the best option and confirm. For example, upon receiving the charge request the server 80 determines that each of mobile platforms 100*a*, 100*b*, and 100*c* are in the geographic area. The server 80 confirms that each is available and has the capacity to meet the charge request. In one example, the server 80 determines which option is the best and sends this to the traveler (e.g., mobile platform 100*c* because it is on Interstate 95 on which the traveler is traveling). In another example, the server 80 gives each of the options to the traveler who then determines which mobile platform 100 to use for the charging.

In one example, the server 80 determines that there are no mobile platforms 100 within the geographic area. The server 80 will notify the traveler of the nearest mobile platform 100 and ask whether this is an option for the traveler.

In one example, the platform 100 is applicable for use with autonomous electric vehicles 200. In use, the electric vehicles 200 contact the server 80 and/or platform 100 to schedule charging. The server 80 and/or platform 100 communicate with the electric vehicle 200 to determine the time and location of the charging. The electric vehicle 200 is then able to arrive at the location and receive the necessary charging. In one example, this process occurs without any human interaction on the part of the electric vehicle 200 or the platform 100/server 80.

In one example, the platform 100 is designed for autonomous operation. The one or more charge terminals 12 and fuel outputs 31 are mounted on robotic arms that can extend and retract. When a vehicle arrives at the platform 100 to receive charging, the charge terminal 12 can extend outward and engage with a plug in the vehicle. The charge terminal can include one or more sensors that detect the location of the plug and align accordingly to secure the engagement. Likewise, for standard vehicle arriving for fuel, the fuel output 31 includes a retractable arm that can extend outward to insert the nozzle 32 into the fuel inlet of the vehicle. The fuel output 31 can include one or more sensors for aligning and inserting the nozzle 32 as needed. The control unit 60 can be configured to receive signals from the various sensors to provide for the autonomous charging and/or fueling operations.

The generator 4 is positioned in the cabinet 43. During operation, the generator 4 creates exhaust gases that are moved out of the cabinet 43. Sound suppression components also reduce the amount of noise created by the generator 4 that is audible outside of the cabinet 4.

Figure 16:
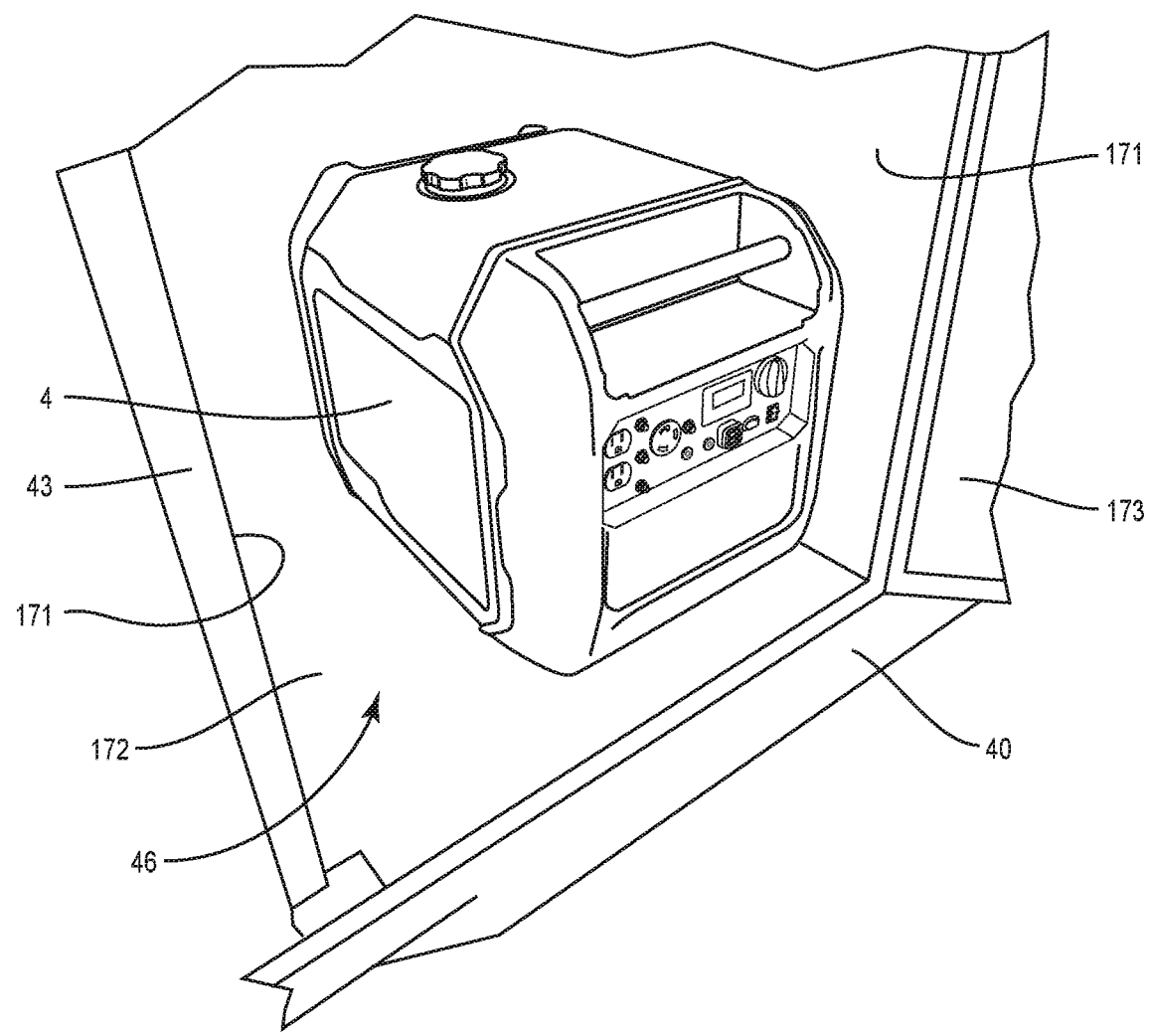
FIG. 16 is a perspective view of a generator positioned in a cabinet that is on a top side of a chassis.

FIG. 16 illustrates the cabinet 43 that is positioned on the chassis 40. The cabinet 43 includes an interior space 46 that is formed by side walls 171, a top wall (see FIG. 4), and a floor 172. One or more doors 173 are pivotally attached to one of the side walls 171 and movable between open and closed positions. In one example, the interior space 46 of the cabinet 43 extends across the width of the chassis 40. Doors 173 are positioned on each lateral side to provide access to different sections of the interior space 46. The interior space 46 is enclosed to protect the equipment within the interior space 46, including the generator 4. The doors 173 can be locked to limit access to the interior space 46.

As illustrated in FIG. 16, the generator 4 is positioned on the floor 172 of the interior space 46. Controls are positioned on the front side of the generator 4 and accessible to a user when the door 173 is in an open position. In one example, a fuel line extends from the fuel tank 30 to maintain fuel in the generator 4. Additionally or alternatively, the generator 4 includes a fuel inlet and fuel tank to receive the fuel from an external source (e.g., filled via a gas can by a user).

In one example, the generator 4 is a Generac Model No. G0071270 available from Generac Power Systems, Inc. In another example, the generator 4 is a Generac iQ3500 available from Generac Power Systems, Inc. Another example of a generator 4 is a Honda Model No. EU7000iS available from Honda Power Equipment.

Figure 17:
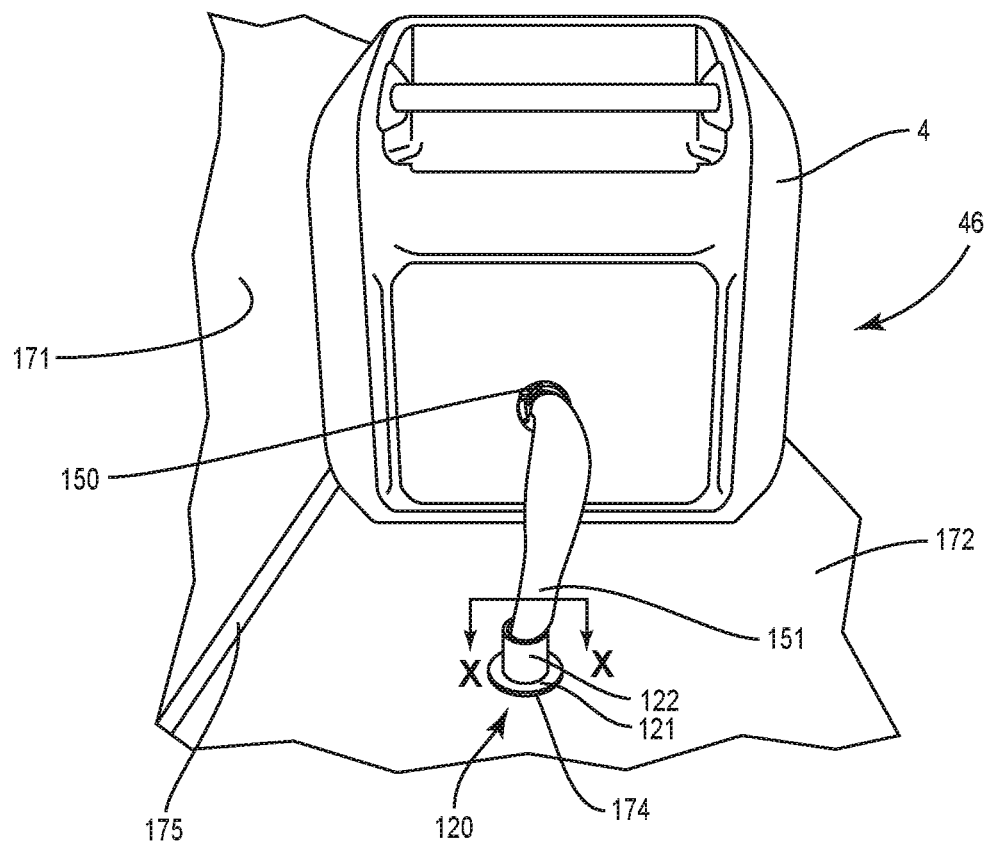
FIG. 17 is a perspective view of a generator positioned in a cabinet and with an exhaust hose extending from the generator and through a floor of the cabinet.

FIG. 17 illustrates a rear side of the generator 4 positioned in the interior space 46 of the cabinet 43. The generator 4 includes an exhaust port 150. Exhaust gases that result from the operation of the combustion engine in the generator 4 are outputted through the exhaust port 150. An exhaust conduit 151 is attached to the exhaust port 150 to receive the exhaust gases and direct them out of the interior space 46 of the cabinet 43. The conduit 151 extends through an opening 174 in the floor 172 of the cabinet 43.

In one example, a flange member 120 is attached to the floor 172 at the opening 174. The flange member 120 includes an enlarged flange 121 that is secured to the floor 172 with one or more mechanical fasteners, and a neck 122 that extends upward from the flange 121. The flange 121 is sealed to the floor 172 with one or more of a gasket, gel, and adhesive to prevent the exhaust gases from returning into the interior space 46. The flange member 120 is attached to the floor 172 to prevent fluids that accumulate on the floor 172 from leaking through the opening 174. The flange member 120 is a single piece and includes a height measured between the bottom of the flange 121 and the top of the neck 122. In the event of a fluid leak within the cabinet 43, the flange member 120 prevents the fluid from leaking out of the interior space 46 through the opening 174. In one example, the bottom 172 of the cabinet 43 is leak-proof to contain fluid within the interior space 46. In one example, the bottom section of the cabinet 43 includes a pan 175 that prevents the escape of fluids. The pan 175 forms the floor 172 and a lower section of the side walls 171, including at the one or more doors 173. The pan 175 form a basin to hold the fluid. The height of the neck 122 of the flange member 120 includes a comparable height to maintain the fluid.

Figure 18:
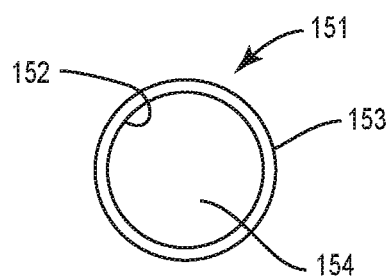
FIG. 18 is a schematic section view cut along line X-X of FIG. 17 illustrates the exhaust hose with inner and outer members.

In one example as illustrated in FIG. 18, the conduit 151 includes an inner member 152 and an outer member 153 that extend around and form an interior space 154 through which the exhaust gases pass. In one example, the exhaust gas may heat the inner member 152. The gap between the inner member 152 and the outer member 153 prevents the heating of the outer member 153.

Figure 19:
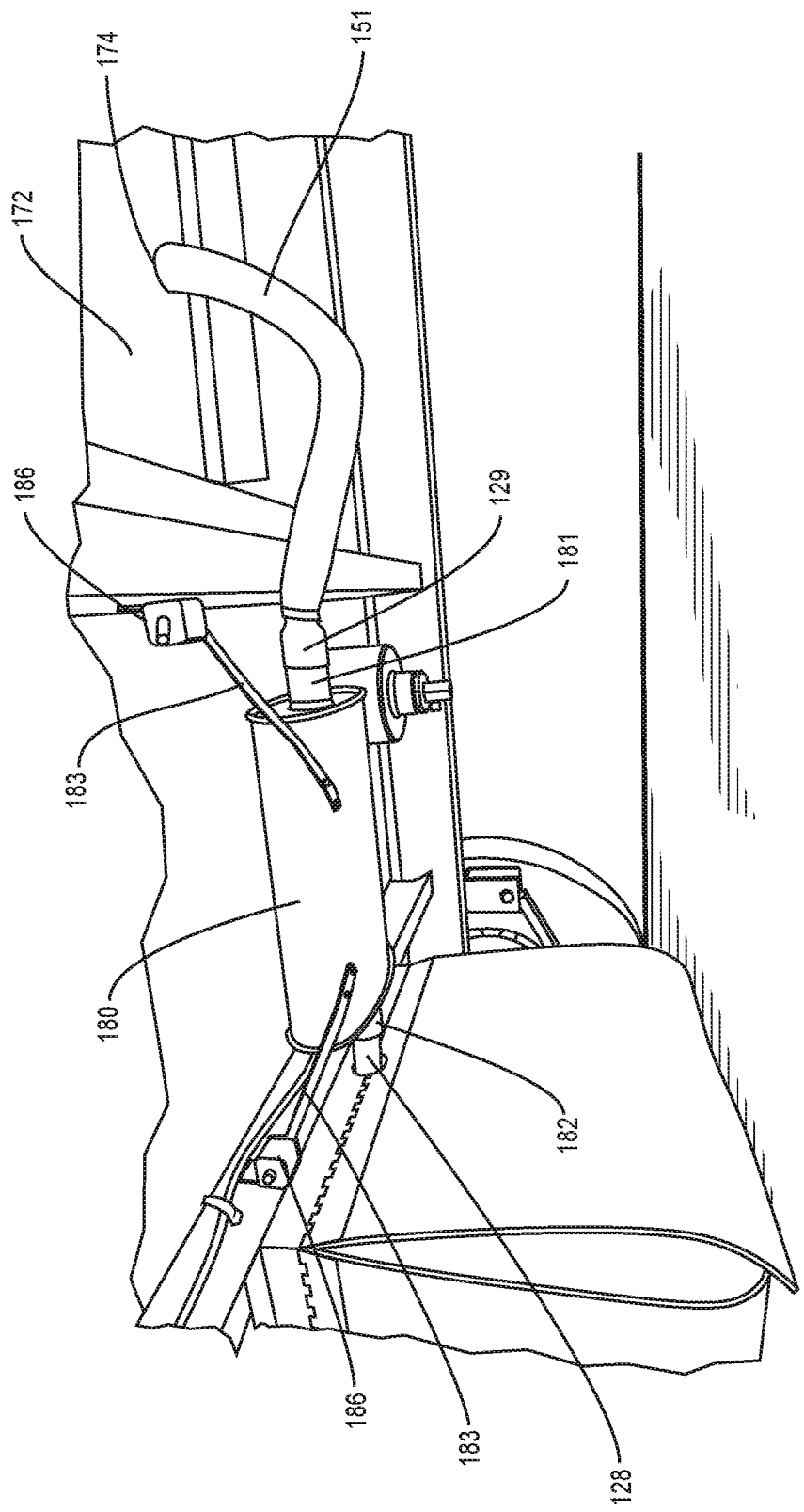
FIG. 19 is a perspective view of a muffler positioned at a bottom side of the chassis and mounted with arms and with an exhaust hose extending through the chassis and into the muffler.
Figure 20:
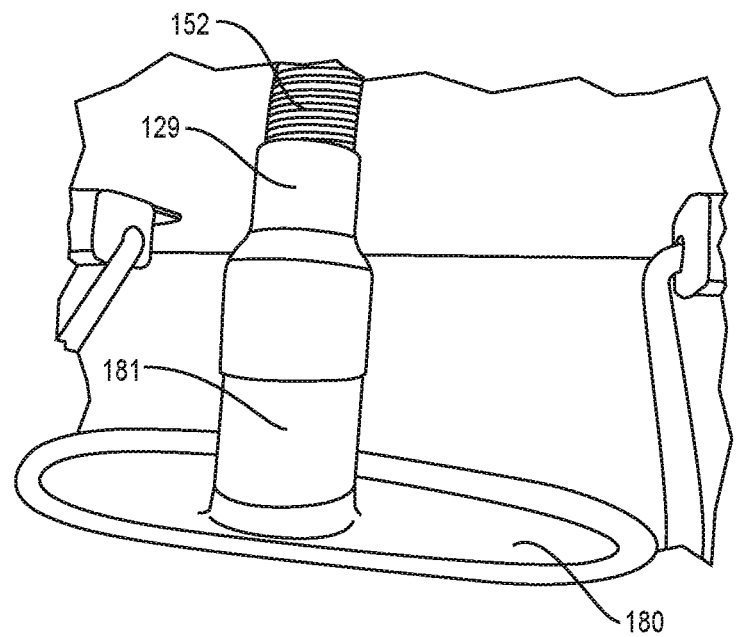
FIG. 20 is a perspective view of an exhaust house mounted to an inlet of a muffler and with an inner member of the exhaust hose exposed.

FIG. 19 illustrates the outer member 153 of the conduit 151 extending along the length with the outer member 153 being exposed and extending over the interior inner member 152. FIG. 20 illustrates the outer member 153 pulled back at a connector 129 to expose the inner member 152.

FIG. 19 illustrates the bottom of the chassis 40 below the cabinet 43. The floor 172 of the cabinet 43 includes the opening 174 through which the conduit 151 exits. The conduit 151 extends into a muffler 180. The conduit 151 is attached with a connector 129 to an inlet 181 of the muffler 180.

Figure 21:
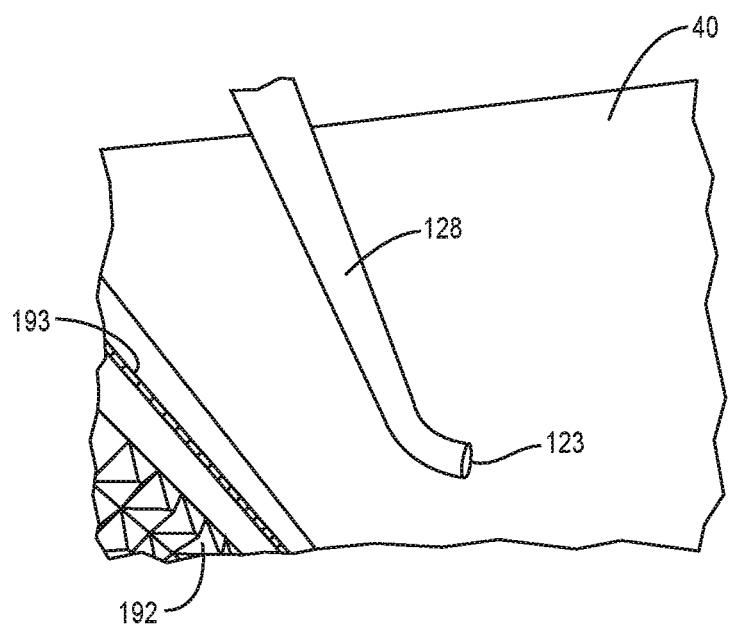
FIG. 21 illustrates a perspective view of an outlet of the exhaust hose formed by a pipe positioned below a chassis.

As illustrated in FIGS. 19 and 21, a pipe 128 extends outward from an outlet 182 of the muffler 180. The pipe 128 extends along the underside of the chassis 40 and includes an outlet 123 through which the exhaust gases are output. In one example, the outlet 123 is positioned at a rearward part of the chassis 40 underneath the fuel tank 30. In one example, the outlet 123 is positioned in proximity to and in front of the wheels 41.

Figure 22:
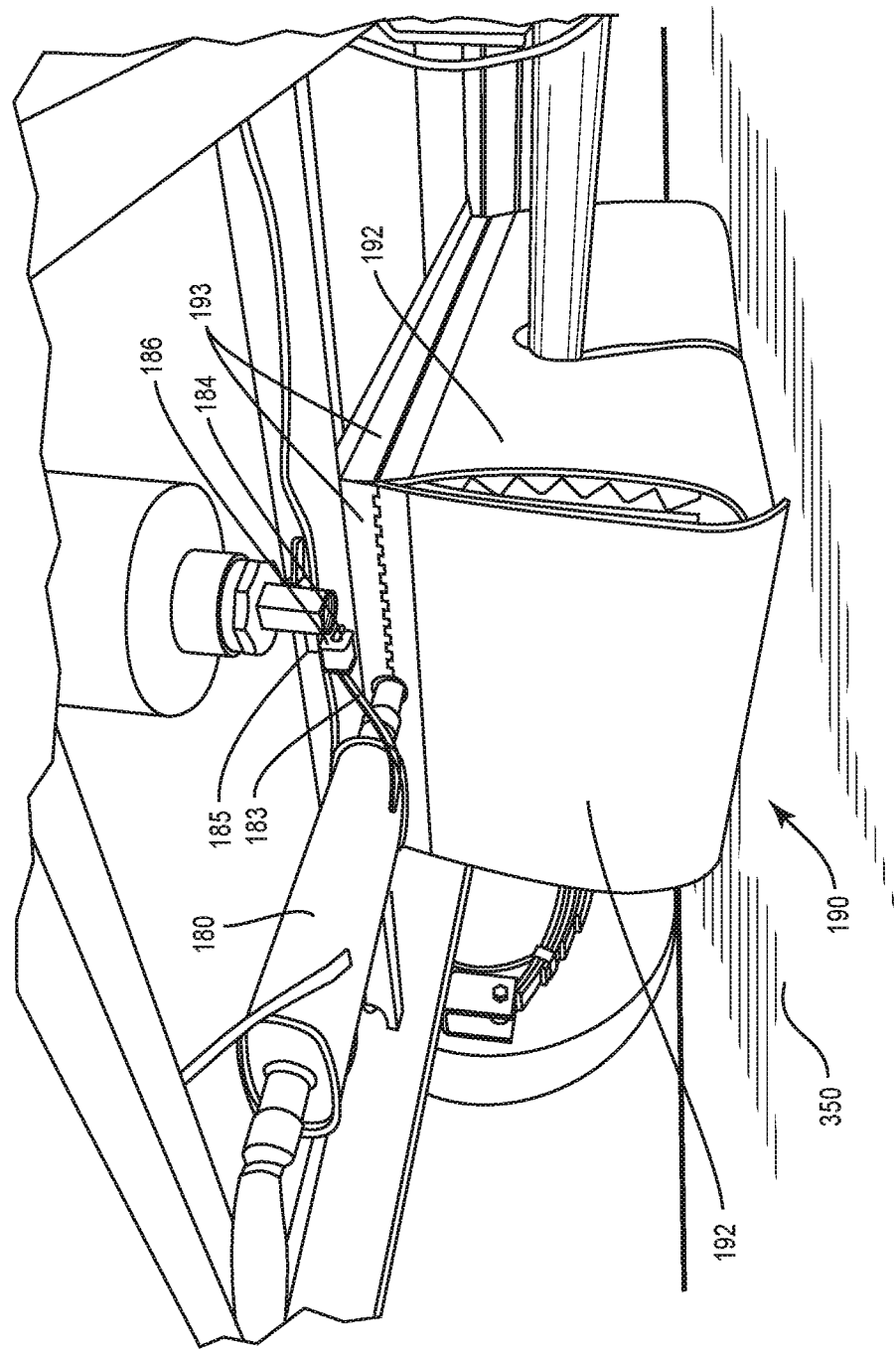
FIG. 22 is a perspective view of a sound chamber formed by sidewalls and positioned below a chassis.
Figure 23:
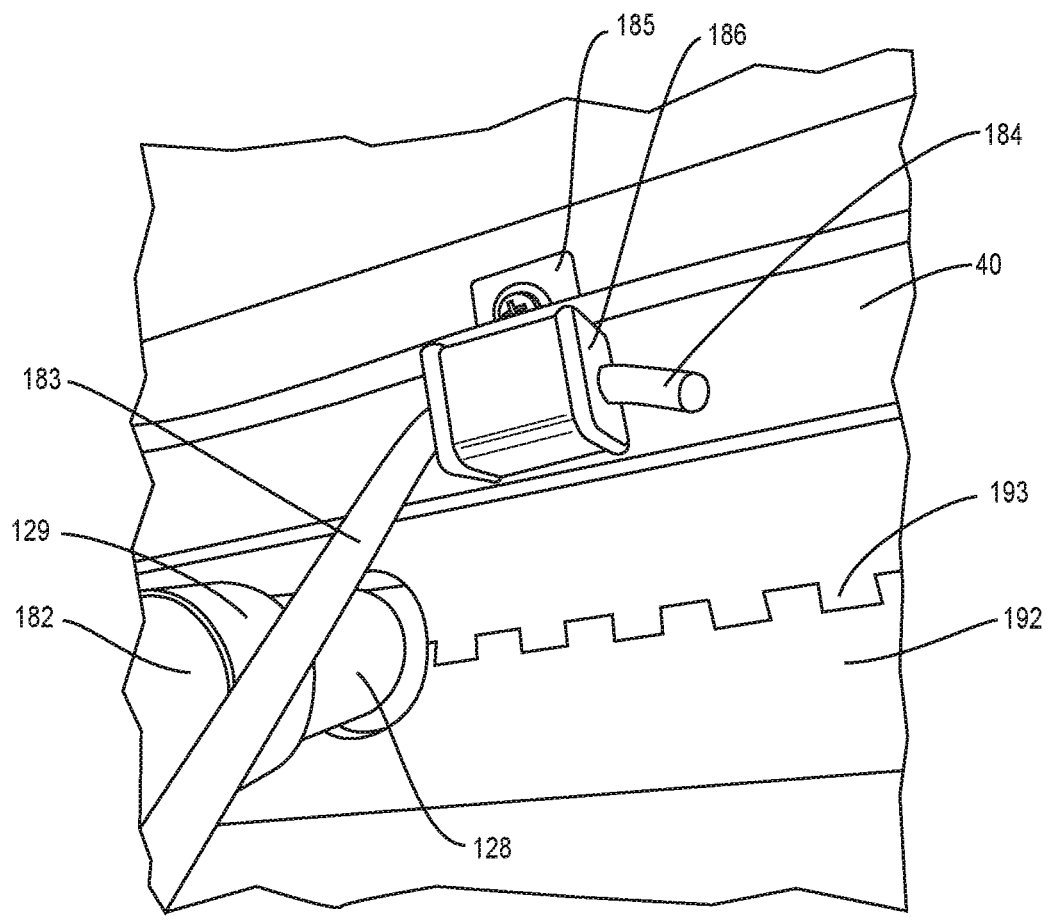
FIG. 23 is a perspective view of a bracket and mount that connect an arm that supports a muffler to a chassis.

The noise resulting from the operating generator 4 is suppressed. The muffler 180 located along the exhaust line provides for sound suppression. The muffler 180 is suspended from the chassis 40 by arms 183. Thus, the muffler 180 does not directly contact against the chassis 40. As illustrated in FIGS. 22 and 23, each of the arms 183 includes ends 184 that are positioned in rubber mounts 186 that are secured to the chassis 40 by brackets 185. The rubber mounts 186 absorb movement and vibration of the muffler 180. The rubber mounts 186 further space the arms 183 away from the chassis 40 to prevent contact that could cause noise. In one example, a pair of arms 183 mount the muffler 180 to the chassis 40 with each arm 183 connected to the chassis 40 by a pair of mounts 186 and brackets 185.

Figure 24:
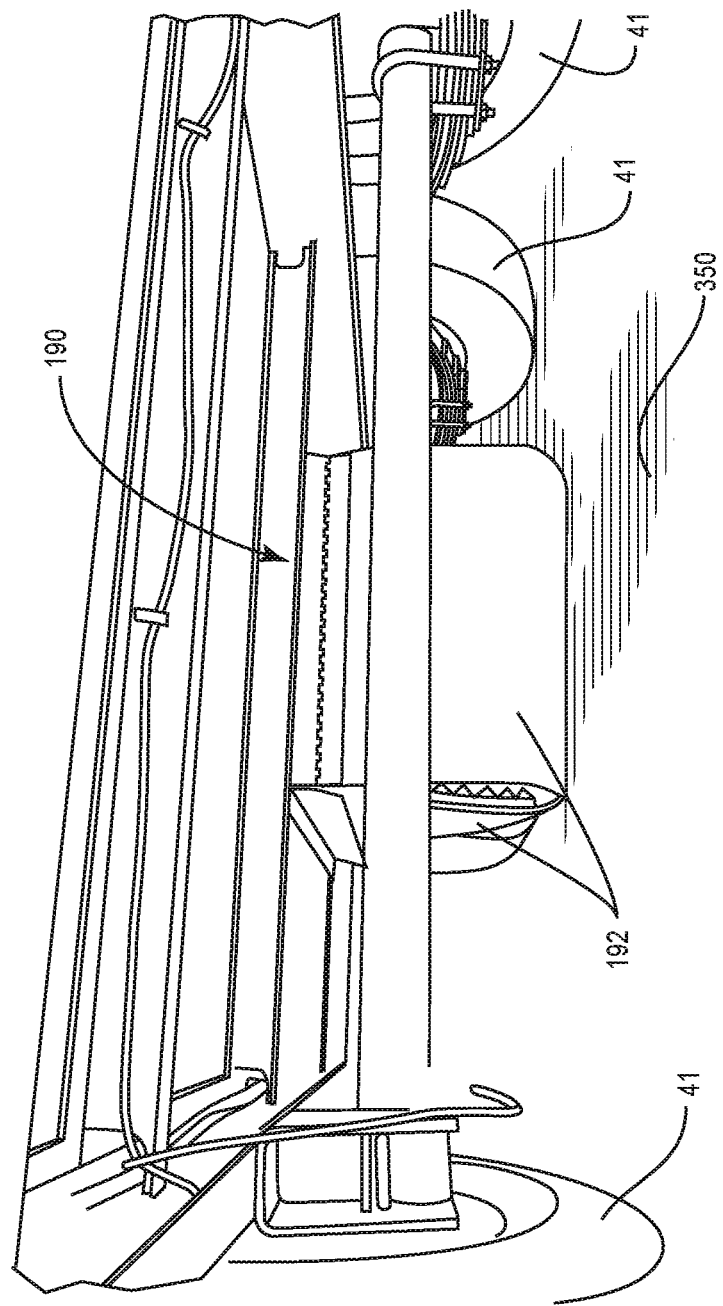
FIG. 24 is a perspective view of a sound chamber positioned below a chassis.

Sound is further suppressed by a chamber 190 that is positioned below the chassis 40. The outlet 123 of the pipe 128 is positioned in the chamber 190 as illustrated in FIG. 21. In one example as illustrated in FIGS. 22 and 24, the chamber 190 is positioned below a floor of the chassis 40. In one example, the chamber 190 is positioned below the fuel tank 30 and in front of the wheels 41.

Figure 25:
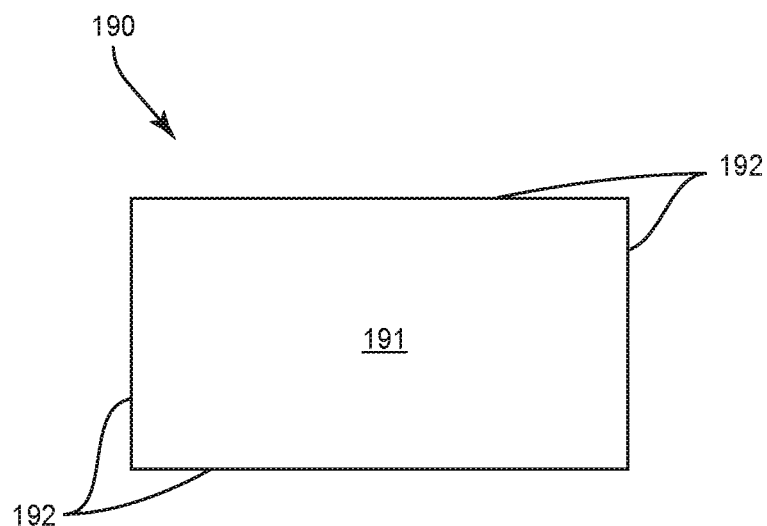
FIG. 25 is a schematic bottom view of a sound chamber formed by sidewalls that extend around an interior space.

As schematically illustrated in FIG. 25, the chamber 190 is formed by side walls 192 that are mounted to and extend downward from a bottom of the chassis 40. In one example, the side walls 192 are connected together to form a complete enclosure that extends around and forms an interior space 191. The bottom of the chamber 190 is open to allow the exhaust gases that exit through the pipe 128 to exhaust into the environment. In another example, one or more openings are formed in the sides of the chamber 190. The openings can be positioned at the corners of the side walls 192 to allow each side wall 192 to independently move relative to the other side walls 192.

In one example, the side walls 192 extend downward and contact against the surface 350 below the portable tank. In another example, the side walls 192 are spaced away from the surface 350. The various walls can include the same or different sizes such that gaps between the walls and the surface 350 can vary at different points of the chamber 190. In one example, the side walls 192 are spaced away from the surface 350 to prevent dragging against the surface 350 when the mobile platform 100 is being pulled by a vehicle.

One or more of the side walls 192 can be connected to the chassis 40 with a hinge 193.

A hinge 193 can connect to the chassis 40 and to side walls 192 such that the side walls 192 can pivot relative to the chassis 40. The pivoting movement can maintain the side walls 192 in a downward position when the mobile platform 100 is positioned on uneven ground or otherwise positioned over an obstacle on the surface 350. The pivoting movement can also protect the sidewalls 192 and allow them to move when the mobile platform 100 is being towed by a vehicle and thus prevent damage when the side walls 192 contact against an object or the surface 350. The pivoting movement also facilitates accessing the interior space 191 of the chamber 190. In one example, each of the side walls 192 are attached with a hinge 193. In another example, a limited number of side walls 192 are attached with a hinge 193.

Figure 26:
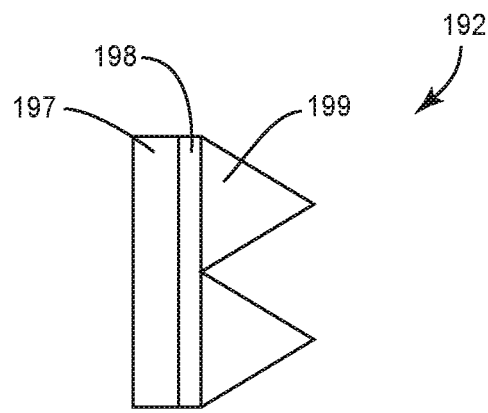
FIG. 26 is a schematic partial section view of a sidewall of a sound chamber that is formed by multiple layers of different materials.

The sidewalls 192 are constructed to suppress the sound. In one example, the side walls 192 are made of two or more layers of material that each suppress a portion of the sound. FIG. 26 illustrates an example in which the sidewall 192 is constructed from three layers. A first outer layer 197 is a hard rubber. An intermediate layer 198 is a softer rubber, such as neoprene. An inner layer 199 is a foam material and can include pyramid-like projections that further act to suppress the sound. In one example, the foam material is an open-celled foam. The outer layer 197 constructed of a more durable material can provide protection to the one or more inner layers 198, 199. The outer layer 197 can provide a shield against materials that could strike the chamber 190 during transport of the mobile platform 100. The outer layer 197 also provides protection against water, ice, snow, etc. that could come in contact with the chamber 190 during use.

Each of the different layers of the sidewalls 192 are constructed from different materials that have a different sound absorption ability. Therefore, the combination of different materials provides for an effective sound suppression.

Figure 27:
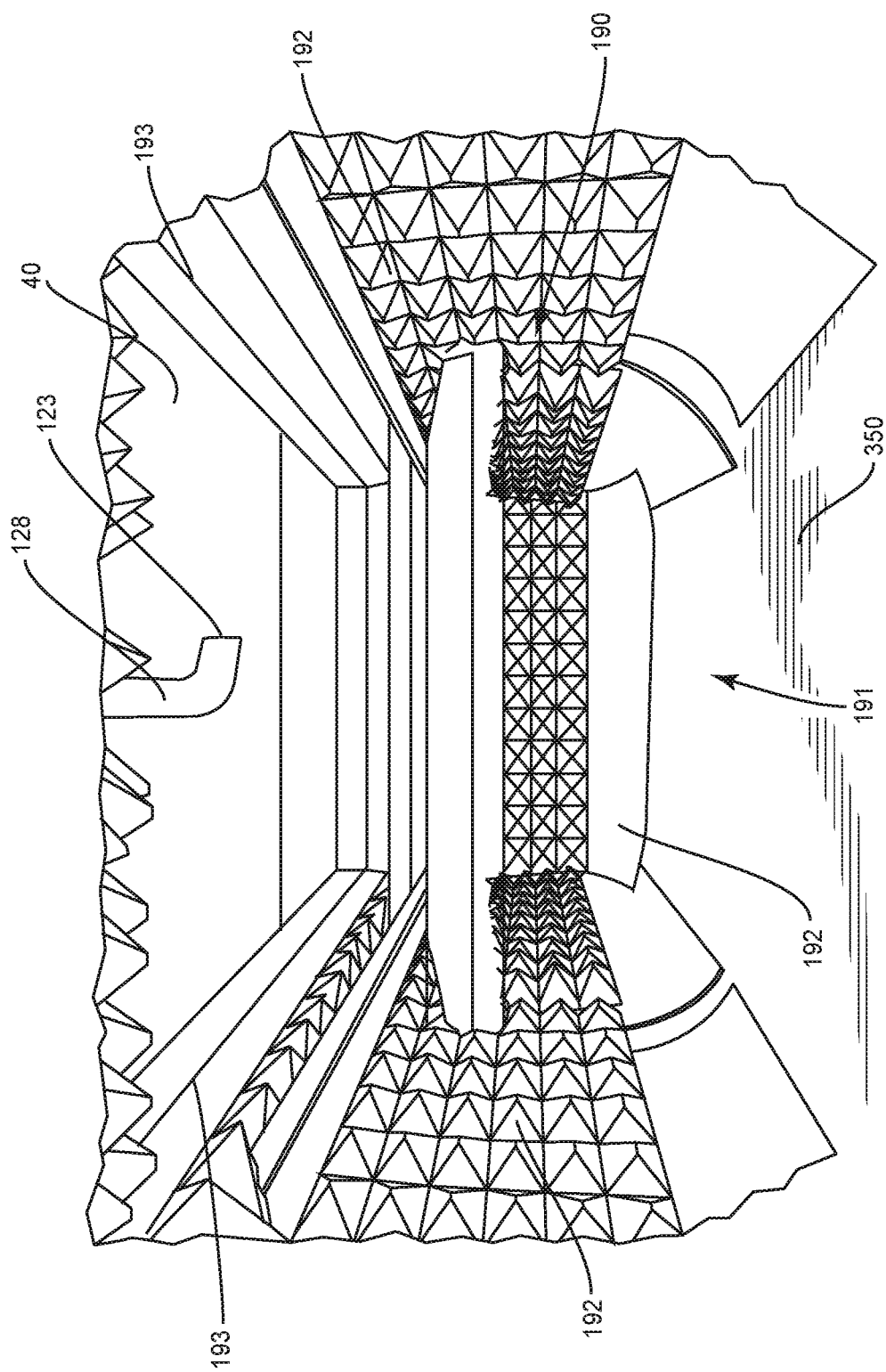
FIG. 27 is a perspective view of an interior space of a chamber that is formed by sidewalls.
Figure 28:
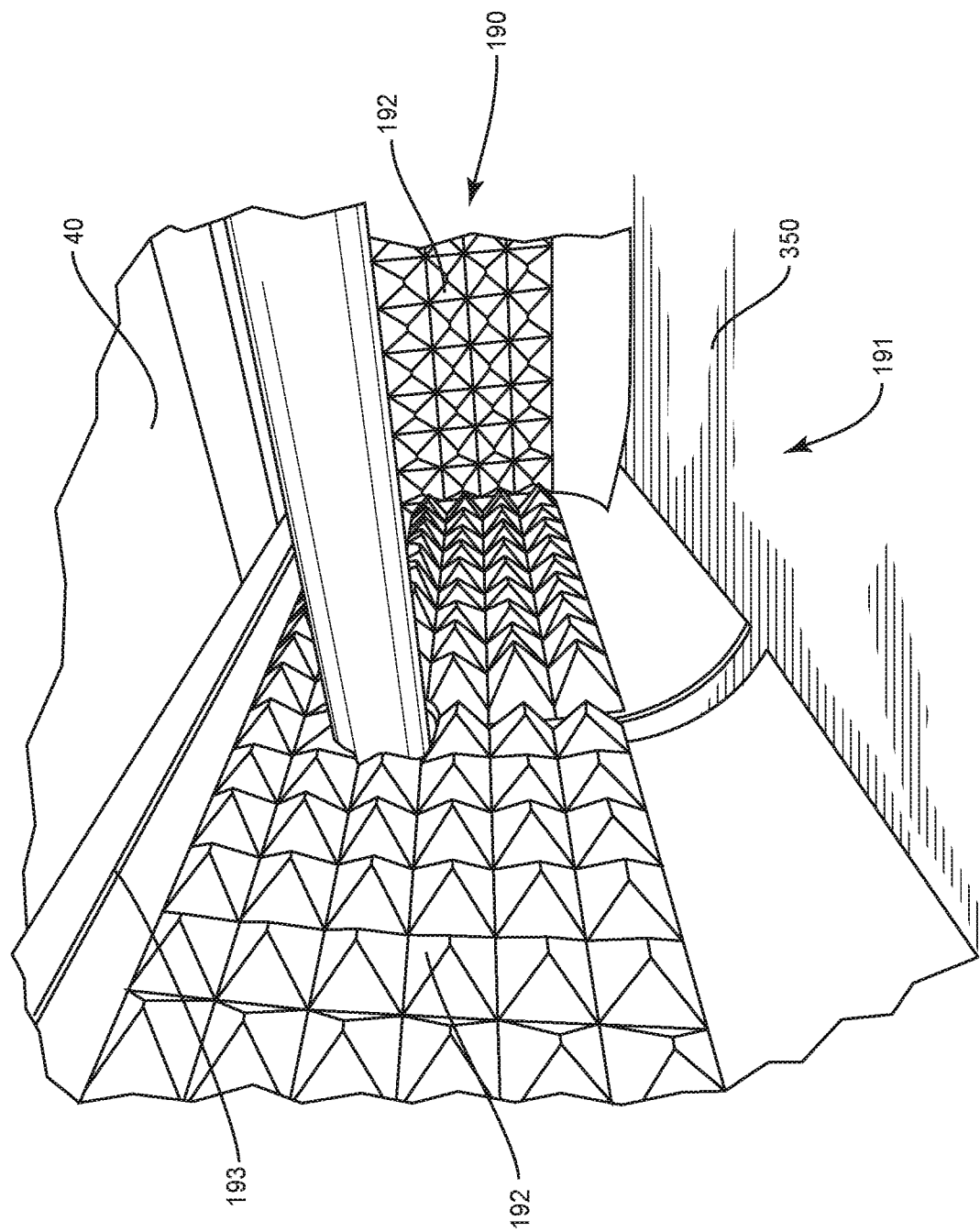
FIG. 28 is a perspective view of an interior space of a chamber that is formed by sidewalls.

FIGS. 27 and 28 illustrate the interior space 191 of the chamber 190. In this example, the inner layer 199 is exposed along a portion of the side walls 192. In one example, the inner layer 199 extends along an upper section of the side walls 192 and is spaced away from a lower section. This spacing prevents the inner layer 199 from being damaged while the mobile platform 100 is moving. One or both of the outer and intermediate layers 197, 198 extend beyond the inner layer 199.

As illustrated in FIG. 27, the bottom of the chamber 190 is open. The surface 350 is visible below the interior space 191. This provides for the exhaust gases to be distributed into the environment.

In one example as illustrated in FIGS. 27 and 28, an axle for a pair of the wheels 41 extends through the chamber 190. This is caused to the position of the chamber 190 along the length of the mobile platform 100. The chamber 190 is shaped and sized to extend around the axle and still provide for noise suppression.

In one example disclosed above, the exhaust conduit 151 extends through a floor of the cabinet 43. In another example, the exhaust conduit 151 extends through a side wall or top wall of the cabinet 43.

In one example disclosed above, a muffler 180 is positioned along the exhaust conduit 151. In another example, there is no muffler 180 along the exhaust conduit 151.

In one example, one or more of the walls 192 of the sound chamber 190 are constructed from multiple layers of different materials. In another example, one or more of the walls 190 are constructed from a single material.

In one example, the exhaust conduit 151 includes multiple overlapping sections. In another example, the exhaust conduit 151 includes a single section.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive.

What is claimed is:

1. A mobile platform comprising:
a chassis configured to be pulled by a tow vehicle;
a battery bank positioned on the chassis;
a renewable energy recharging device positioned on the chassis to recharge the battery bank;
a liquid fuel-powered recharging device positioned on the chassis to recharge the battery bank;
an electrical terminal operatively connected to the battery bank to deliver electric power from the battery bank to an electric vehicle;
a fuel tank positioned on the chassis to store liquid fuel;
a fuel line that extends from the fuel tank to deliver the liquid fuel; and
the mobile platform configured to simultaneously distribute the liquid fuel from the fuel tank to a receiving vehicle and deliver the electric power from the battery bank to the electric vehicle.

2. The mobile platform of claim 1, wherein the chassis comprises:
a frame with a hitch for engagement with the tow vehicle; and
wheels mounted to the frame.

3. The mobile platform of claim 1, wherein the renewable energy recharging device comprises a photovoltaic solar panel that is mounted on a top of the fuel tank.

4. The mobile platform of claim 1, wherein the fuel tank is physically larger than the battery bank.

5. The mobile platform of claim 1, wherein the liquid fuel-powered recharging device comprises a gas-powered generator.

6. The mobile platform of claim 1, wherein the liquid fuel-powered recharging device comprises an electric generator comprising:
a combustion engine;
an exhaust port for gases produced by the combustion engine; and
an exhaust hose comprising an elongated shape with first and second ends with the first end mounted to the exhaust port and with the exhaust hose extending through a floor in the chassis and with the second end positioned at the bottom side of the chassis.

7. The mobile platform of claim 6, wherein the combustion engine of the electric generator operates on the liquid fuel that is stored in the fuel tank.

8. The mobile platform of claim 6, further comprising a muffler mounted to the exhaust hose to suppress sound from the electric generator, the muffler mounted to a bottom side of the chassis.

9. The mobile platform of claim 6, further comprising a sound chamber mounted to the chassis and the second end of the exhaust hose terminates within the sound chamber.

10. The mobile platform of claim 1, further comprising a cabinet positioned on the chassis and comprising an enclosed interior space, the liquid fuel-powered recharging device positioned within the interior space of the cabinet.

11. The mobile platform of claim 1, wherein the renewable energy recharging device is a first renewable energy recharging device and further comprising a second renewable energy recharging device positioned on the chassis to recharge the battery bank.

12. A mobile platform comprising:
a wheeled chassis;
a battery bank mounted on the chassis;
a charge terminal electrically connected to the battery bank and comprising a plug to charge electric vehicles;
a generator mounted on the chassis, the generator comprising an internal-combustion engine and configured to recharge the battery bank;
a renewable energy charging device mounted on the chassis to recharge the battery bank; and
a fuel tank mounted on the chassis to store liquid fuel, the fuel tank comprising one or more fuel lines to dispense the liquid fuel to internal combustion vehicles;
wherein the mobile platform is configured to simultaneously charge the electric vehicles and to dispense the liquid fuel to the internal combustion vehicles.

13. The mobile platform of claim 12, further comprising a cabinet mounted on the chassis and positioned between a front hitch of the chassis and the fuel tank.

14. The mobile platform of 12, further comprising a fuel line that extends from the fuel tank to the generator, the fuel line configured to supply the liquid fuel from the fuel tank to the generator.

15. The mobile platform of claim 12, wherein the fuel tank is physically larger than the battery bank.

16. A method of charging vehicles with a mobile platform, the method comprising:
towing the mobile platform from a first geographic location to a second geographic location;
extending an electrical terminal from the mobile platform to an electric vehicle;
supplying electrical energy from a battery bank on the mobile platform through the electrical terminal and to the electric vehicle;
extending a fuel line from the mobile platform to an internal combustion engine vehicle;
supplying liquid fuel from a fuel tank on the mobile platform through the fuel line and to the internal combustion engine vehicle;
producing electrical energy through a renewable energy recharging device positioned on the chassis and recharging the battery bank;
powering a liquid fuel powered recharging device positioned on the chassis and producing electrical energy and recharging the battery bank; and
simultaneously supplying the electrical energy from the battery bank to the electric vehicle and supplying the liquid fuel from the fuel tank to the internal combustion engine vehicle.

17. The method of claim 16, further comprising supplying fuel from the fuel tank to the liquid fuel powered recharging device when a fuel level on the fuel powered recharging device falls below a predetermined level.

18. The method of claim 16, further comprising simultaneously recharging the battery bank with the renewable energy recharging device and the liquid fuel powered recharging device.

19. The method of claim 16, wherein producing the electrical energy through the renewable energy recharging device comprises producing the electrical energy through photovoltaic solar panels mounted on the chassis.

* * * * *